US007289574B2

United States Patent
Parolari

(10) Patent No.: US 7,289,574 B2
(45) Date of Patent: Oct. 30, 2007

(54) METHOD OF LINK ADAPTATION IN ENHANCED CELLULAR SYSTEMS TO DISCRIMINATE BETWEEN HIGH AND LOW VARIABILITY

(76) Inventor: Sergio Parolari, Via Canaletto, 14, I-20133 Milan (IT)

( * ) Notice: Subject to any disclaimer, the term of this patent is extended or adjusted under 35 U.S.C. 154(b) by 725 days.

(21) Appl. No.: 10/680,122

(22) Filed: Oct. 8, 2003

(65) Prior Publication Data

US 2004/0081248 A1   Apr. 29, 2004

(51) Int. Cl.
 *H04L 27/00* (2006.01)
(52) U.S. Cl. ............... 375/295; 375/316; 375/259
(58) Field of Classification Search ........... 375/295, 375/316, 259
See application file for complete search history.

(56) References Cited

U.S. PATENT DOCUMENTS

| | | | |
|---|---|---|---|
| 5,764,699 A | 6/1998 | Needham et al. | |
| 6,208,663 B1 * | 3/2001 | Schramm et al. | 370/465 |
| 6,823,005 B1 * | 11/2004 | Chuang et al. | 375/227 |
| 6,865,233 B1 * | 3/2005 | Eriksson et al. | 375/261 |
| 2002/0036992 A1 * | 3/2002 | Balachandran et al. | 370/329 |

FOREIGN PATENT DOCUMENTS

| | | |
|---|---|---|
| EP | 0 903 883 | 3/1999 |
| WO | WO 01/43333 | 6/2001 |

OTHER PUBLICATIONS

Introduction to probability ans statistics for engineers and scientists; XP002180737; pp. 426 and 427; Sheldon M Ross.

\* cited by examiner

*Primary Examiner*—Temesghen Ghebretinsae
*Assistant Examiner*—Juan Alberto Torres

(57) ABSTRACT

To perform link adaptation at radio interfaces of an enhanced packet data cellular network the system behavior is simulated for different C/I conditions. Two sets of tables are obtained, each table including upgrade and downgrade thresholds expressed in terms of Block Error Rate (BLER). The tables are specialized for taking into account EGPRS type II hybrid ARQ, Incremental Redundancy (IR). Transmitted blocks are checked for FEC and results are sent to the network that continuously updates BLER. A reliability filter output is used to decide the weight between new and old measurements. IR efficiency is tested for each incoming block and an indicative variable IR_status is filtered. Each threshold of BLER to be used is obtained by linear interpolation between the tabulated threshold without IR and with perfect IR, both weighed with filtered IR_status. Filtered BLER is compared with interpolated thresholds for testing the incoming of a MCS switching condition.

23 Claims, 12 Drawing Sheets

TRAFFIC CHANNEL ORGANIZATION

Bi-directional full-rate TCH (T) GSM multiframe and associated signalling (A)

26 TDMA frames = 120 ms

GPRS multiframe including 12 Radio blocks (B)
of 4 basic frames each plus 4 idle frames (X)

52 TDMA frame = 240 ms

MAPPING RLC LAYER INTO PHYSICAL LAYER

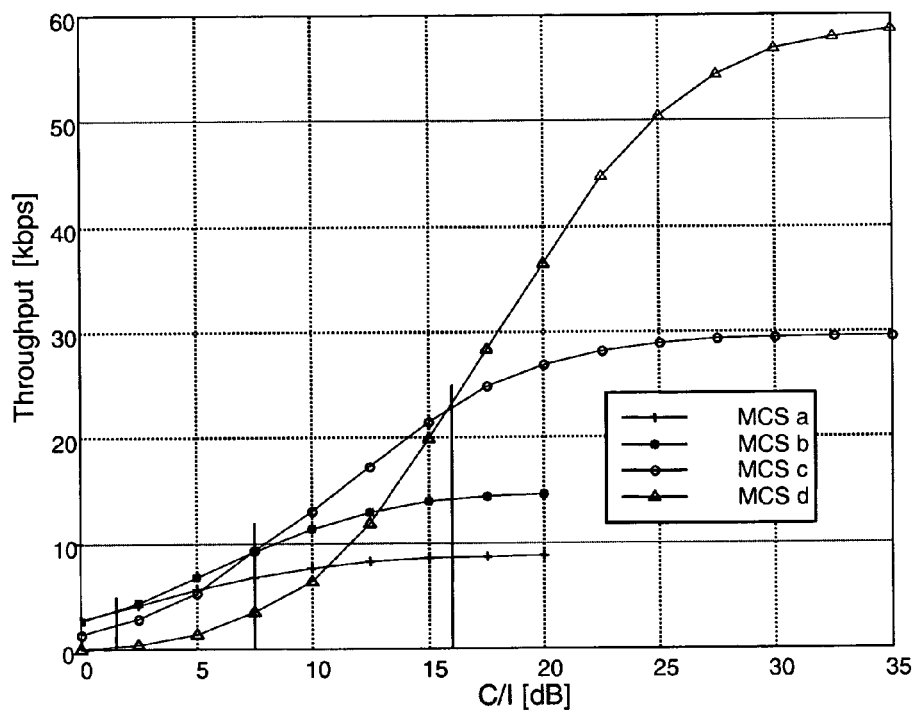
FIG.7 Simulation results for a selection of MCS (low diversity, without IR)
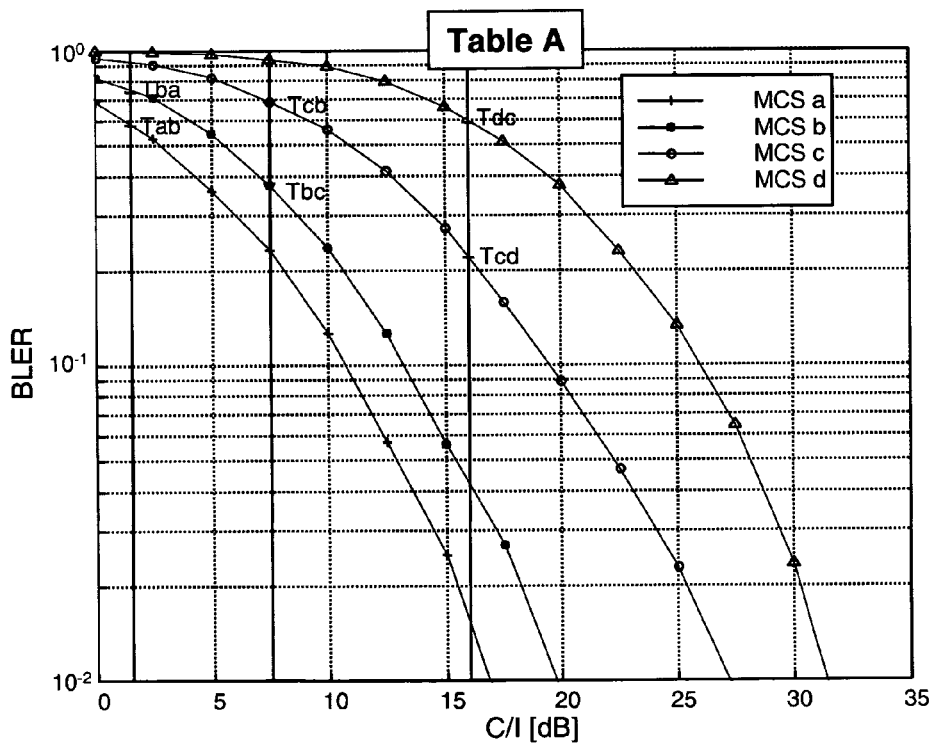
FIG.8 BLER versus C/I for a selection of MCS (low diversity, without IR)

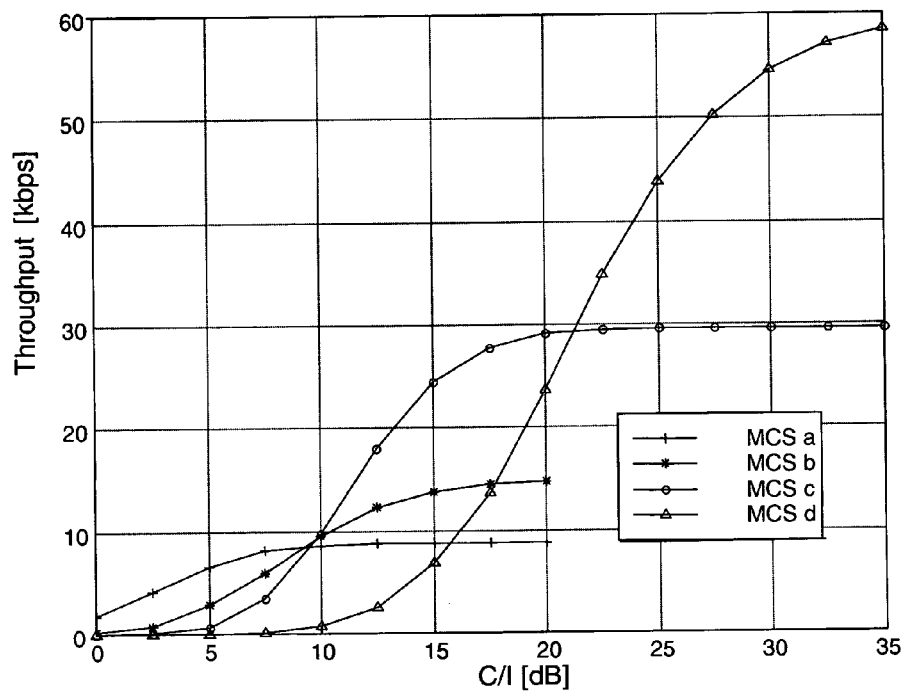
FIG.9 Simulation results for a selection of MCS (high diversity, without IR)
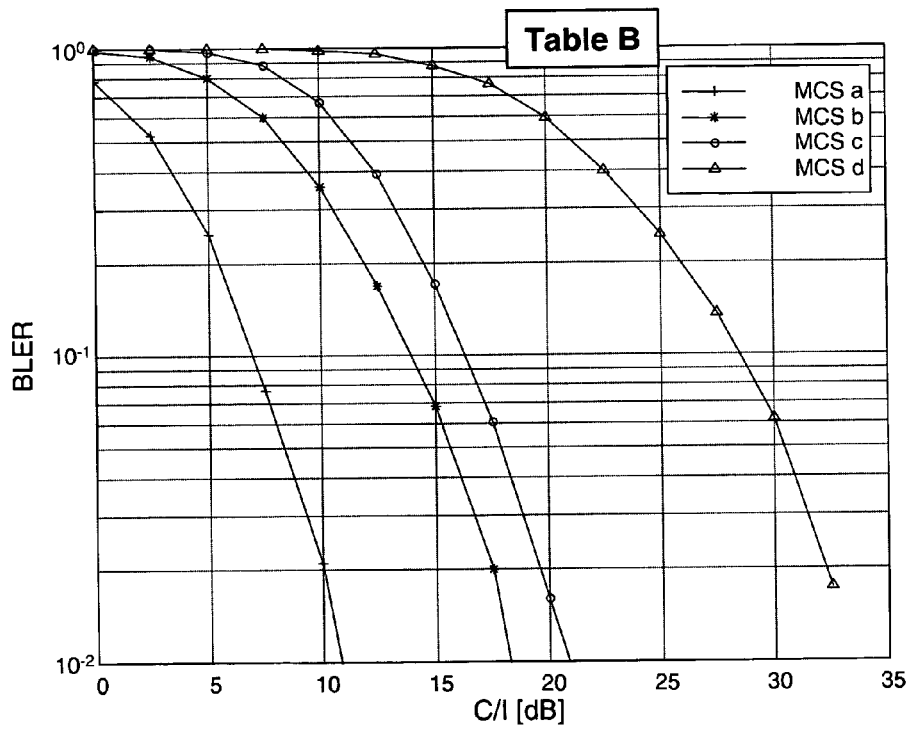
FIG.10 BLER versus C/I for a selection of MCS (high diversity, without IR)

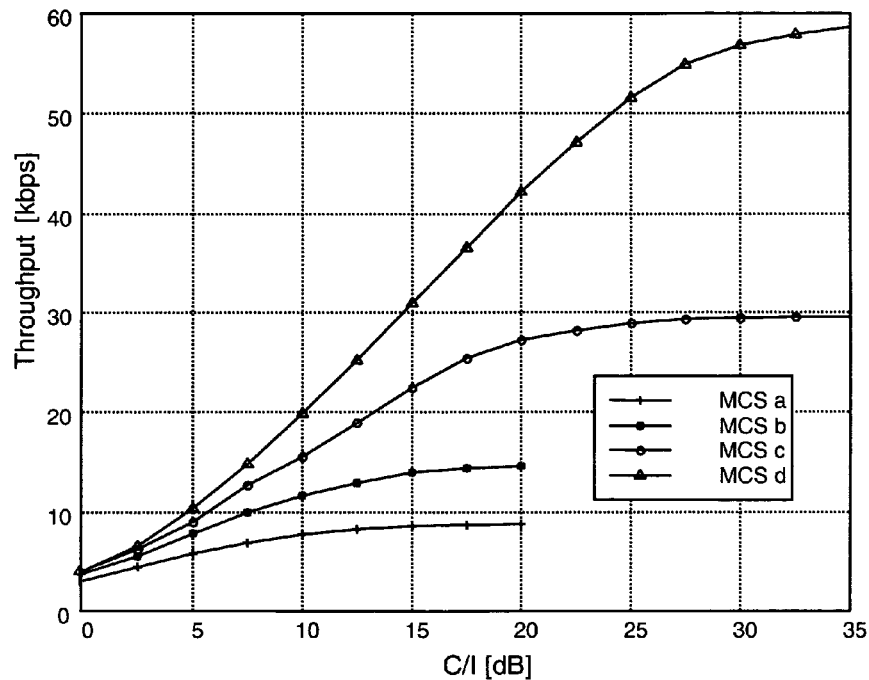
FIG.11 Simulation results for a selection of MCS (low diversity, with IR)
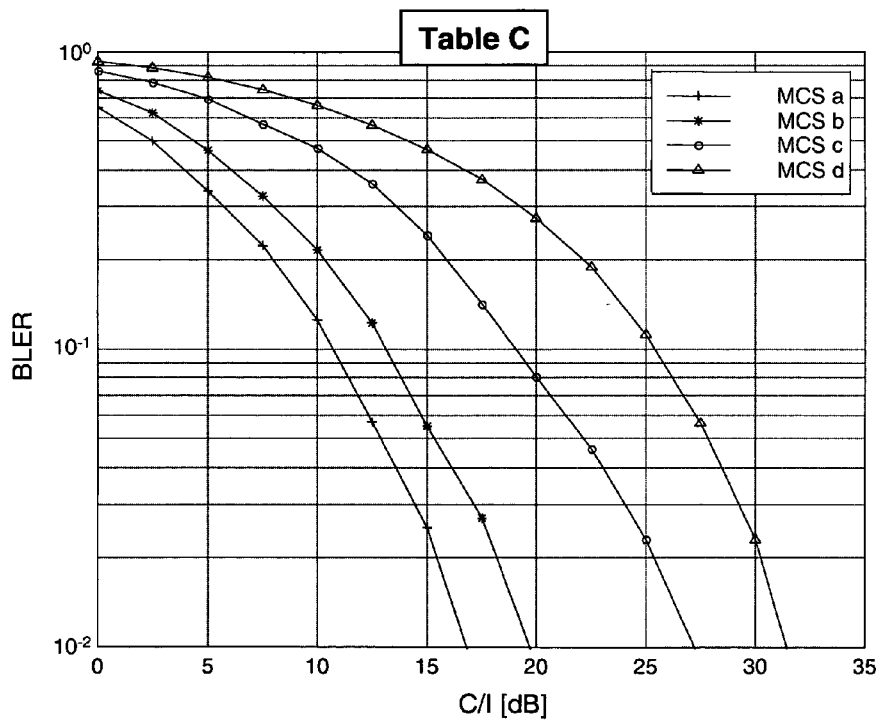
FIG.12 BLER versus C/I for a selection of MCS (low diversity, with IR)

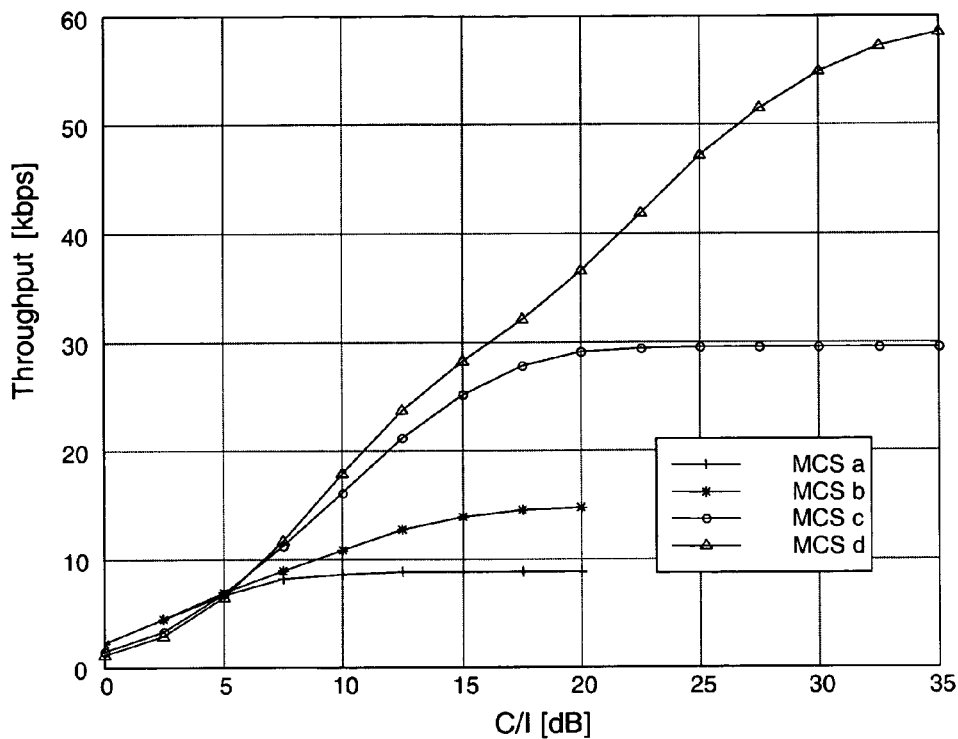
FIG.13 Simulation results for a selection of MCS (high diversity, with IR)
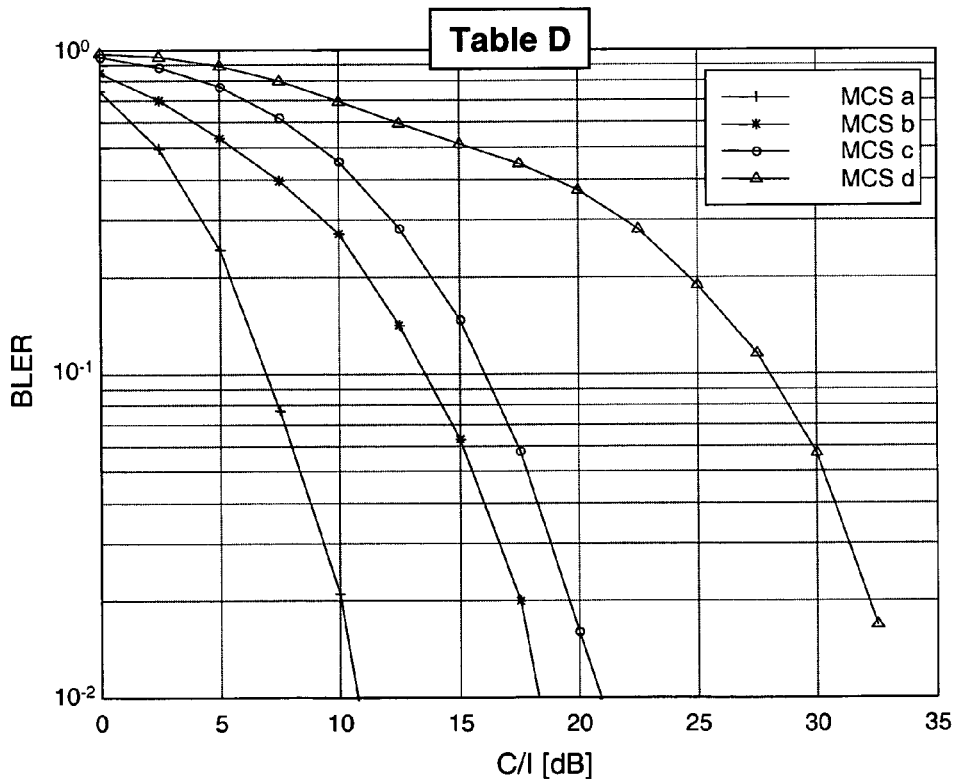
FIG.14 BLER versus C/I for a selection of MCS (high diversity, with IR)

Maximum achievable throughput (with IR)

METHOD OF LINK ADAPTATION IN ENHANCED CELLULAR SYSTEMS TO DISCRIMINATE BETWEEN HIGH AND LOW VARIABILITY

CROSS REFERENCE TO RELATED APPLICATIONS

The present application claims priority to international application PCT/EP02/03881 filed on Apr. 8, 2002 designating the United States, and further claims priority to European patent application EP01830283.6, filed on 30 Apr. 2001, the both of which are herein incorporated by reference.

BACKGROUND OF THE INVENTION

The present invention is referred to the field of radiomobile communication systems and more precisely to an improved method of link adaptation in enhanced cellular communication systems to discriminate between lower or higher variable RF channels with or without incremental redundancy.

Background and relevant prior art in the above technical field is disclosed in the following documents:

International patent application WO 99/12304, titled: A METHOD FOR SELECTING A COMBINATION OF MODULATION AND CHANNEL CODING SCHEMES IN A DIGITAL COMMUNICATION SYSTEM".

U.S. Pat. No. 5,764,699, titled: METHOD AND APPARATUS FOR PROVIDING ADAPTIVE MODULATION IN A RADIO COMMUNICATION SYSTEM.

International patent application WO 00/49760, titled: METHOD AND SYSTEM FOR CONTROL SIGNALLING ENABLING FLEXIBLE LINK ADAPTATION IN A RADIO COMMUNICATION SYSTEM, completely taken into standard ETSI GSM 04.60.

The invention in subject, that will be disclosed later on, is suitable to be employed in the so-called General Packet Radio Service (GPRS), recently added to the Global System for Mobile communications (GSM) for enabling it to manage packet data. So an introduction of the GSM-GPRS system is needed before discussing the apparently nearest prior art. The introduction takes advantage from the large GSM standardization coming from ETSI (European Telecommunications Standards Institute) and also from the volume titled: "The GSM System for Mobile Communication", edited by the authors: Michel MOULY, Marie-Bernadette PAUTET, Copyright 1992).

FIG. 1 of the description is similar to FIG. 2 of standard ETSI GSM 03.60—Service description. The system of FIG. 1 represents a cellular GSM(DCS)-GPRS(Enhanced) network including mobile stations communicating via radio with a fixed remaining part. In FIG. 1 are visible first type of Mobile Stations MS suitable for voice communication (and short messages) and second type of mobile stations named User Equipment UE each comprised of a Terminal Equipment TE for handling data (as a PC) connected to a Mobile Terminating equipment MT suitable to data packet transmission. Mobile stations MS and UE camped on a cell are connected via standard on air interface Um to a fixed Base Transceiver Station BTS which serves either a central or trisectorial cell belongs to a clustered geographical area covered by GSM-GPRS Public Land Mobile Network PLMN. In FIG. 1 more base stations BTS are connected to a Base Station Controller BSC through a not fully standardized Abis interface. The BSC controller includes a block PCU (Packet Control Unit) relevant for the present invention. The BSC controller and the interconnected base station BTS constitute a Base Station Subsystem BSS serving a cluster of cells. An BSC controller in its turn is connected to a Message Switching Centre MSC and to a Service GPRS Support Node SGSN via standard interfaces A and Gb respectively, both supporting SS7 signaling. The MSC center and SGSN node are connected to a Home Location Register HLR and a Visitor Location Register VLR which add intelligence to the network by allowing mobility of communications. The MSC center and SGSN node support Short Message Service SMS, being for this purpose connected to a Short Message Service Centre SM-SC via the functions SMS-GMSC (Short Message Service-Gateway MSC) and SMS-IWMSC (SMS-InterWorking MSC). The SGSN node is further connected to: 1) another SGSN node of the same PLMN network through a standard Gn interface; 2) a Gateway GSN node GGSN belonging to another PLMN network through a standard Gp interface; 3) a Gateway GSN node GGSN belonging to the same PLMN network, through the Gn interface, and the GGSN node is connected to either an IP (Internet Protocol) or X.25 Public Data Network PDN specialized in packet data routing; 4) finally to an Equipment Identity Register EIR. The MSC center is connected to the Public Switching Telephone Network PSTN also comprised of an Integrated Services Digital Network ISDN. Besides the mentioned interfaces also the following standard ones are provided: Gf, Gs, Gr, Gd, D, E, C whose connections are visible in FIG. 1.

The schematized GSM-GPRS system is capable to switch both the traditional voice and data circuits and the new packet data which don't request fixed connections for all the duration of an active session. The SGSN node has the same role for packet data as the MSC center has for voice circuits, it traces individual locations of the mobile stations enabled for data packet communication and performs security and access control functions. For this purpose the HLR register includes information concerning GPRS users. The GGSN node provides interworking with external data packet switching networks, in particular with a backbone network based on IP protocol.

Both GSM and GPRS use standard procedures at the relevant interfaces, namely for: synchronization, cell selection and reselection, paging, access control, request a dedicated channel, security, error detection and correction, retransmission, power control, voice and data flux control, routing, handover, billing, etc. Such procedures belong to a most general protocol having a layered structure named "Transmission Plane" proposed by the International Organization for Standardization (ISO) for Open System Interconnection (OSI). Based on ISO model an OSI system can be described by means of a set of subsystems fit in a protocol stack. A subsystem N which consists of one or more entities of level N interacts only with subsystems immediately upon and below it and a level N entity operates into its own level N. Peer level N entities communicate each other by using services from the underlying layer N. Similarly, layer N services are provided to the layer N+1 at an N-Service Access Point named N-SAP. Information transferred from a starting to an arrival point is always conveyed by physical channels provided at the crossed interfaces. Relevant layers for the arguments developed in this disclosure are the following:

Radio Link Control/Medium Access Control (RLC/MAC). The RLC layer-2 function provides a radio link with reliability and maps into GSM physical channels the Link Layer Control (LLC) layer-3 frames. The MAC function is provided to control and signaling procedures for accessing radio channel, i.e. request and grant. RLC/MAC protocol is standardized in GSM 04.60.

GSM RF is pertaining to the physical radio channel at the Um interface as standardized in the series of specifications GSM 05.xx The physical channel relevant for GPRS service is named PDCH (Packet Data Channel).

At GPRS planning stage the compatibility with pre-existent GSM has been deliberately maintained to enable GPRS of exploiting the same physical channels as GSM at the Um interface and consequently promoting an easy integration. Both for GSM and GPRS there are signaling channels and traffic channels, the first ones are either for broadcast common control or for dedicated control, the second ones are either for voice or packet data. The additional logical GPRS channels, although referred to packet data have names and functional characteristics which follow from the conventional GSM channels; examples of relevant GPRS channels are the following: PBCCH (Packet Broadcast Control Channel), PCCCH (Packet Common Control Channel), PACCH (Packet Associated Control Channel), e PDTCH (Packet Data Traffic Channel). A list of relevant channels is reported in the specification GSM 05.01 titled "Physical layer on the radio path".

The Extended GSM 900 system is required to operate in the following frequency bands:

880-915 MHz: mobile stations transmit uplink, base station receives;

925-960 MHz: base station transmits downlink, mobile stations receive;

while for Digital Cellular System DCS 1 800 the system is required to operate in the following frequency bands:

1.710-1.785 MHz: mobile stations transmit uplink, base station receives;

1.805-1.880 MHz: base station transmits downlink, mobile stations receive.

Each of the above frequency band is also used in GPRS service and includes a plurality of modulated carriers spaced 200 kHz apart. Full-duplex communications take place by Frequency Division Duplexing (FDD) technique. A carrier among those in use in a cell is assigned for all the duration of a timeslot TS out of eight cyclically repeated to allow time division among the users. During the assigned timeslot Modulation (detailed in GSM 05.04) impresses the characteristics of the modulating burst onto one or more physical parameters of a digital carrier to be transmitted at radiofrequency. The GSM-GPRS system exploits a GMSK (Gaussian Minimum Shift Keying) modulation that is a non-linear Continuous Phase Modulation (CPM) characterized by compact spectrum and constant modulation envelope. Compact spectrum generates poor interferences into adjacent frequency channels by introducing a slight worsening of the intersymbolic interference. Constant modulation envelope allows the gain saturation of the power amplifier (class C amplifying) and consequent energy saving from the power supply. Besides power control becomes simpler.

With reference to FIG. 2 it can be appreciate the sequential organization of 8 timeslots TS0, . . . , TS7 constituting a 4,615 ms basic frame used in Time Division Multiple Access (TDMA) GSM-GPRS system. Four different typologies of burst are provided corresponding to the possible contents of any timeslot. The sequential frames are organized within more hierarchical levels observed by all the carriers used in the system. All the carriers transmitted by a BTS have reciprocally synchronized frames. Starting in the figure from bottom to top each timeslot has 0,577 ms duration, corresponding to 156,25×3.69 as bit duration, and carries an information burst containing 142 useful bits, 3+3 tail bits TB, and a guard time GP without information 8,25 bits long. The 3.69 µs bit duration corresponds to 270,83 kbit/s which is the system cipher rate. The burst can be of four different types, namely: Normal burst, Frequency Correction burst, Synchronization burst, and Access burst. For the purposes of disclosure the only Normal burst is depicted in FIG. 2 where it includes 2×58 useful bits, redundancy included, and 26 bits of a training sequence in midamble position. Training sequence is a known pattern used to dynamically synchronize the received burst and to estimate the impulse response of the radio channel for correctly demodulating the incoming signal. The nature of the 116 bits payload will be detailed later on, distinguishing between GSM and GPRS. Continuing towards the upper part of FIG. 2 it can be noticed that two different typologies of multiframes are foreseen, namely a signaling multiframe for carrying control channels and a traffic multiframe for carrying payloads and associated signaling. The signaling multiframe is 253,38 ms long and includes 51 basic TDMA frames. A GSM traffic multiframe is 120 ms long and includes 26 basic TDMA frames. A GPRS traffic multiframe is 240 ms long and includes 52 basic TDMA frames. The two type of multiframes concur to form a unique superframe 6, 12 seconds long, consisting of 1326 basic TDMA frames, finally 2048 sequential superframes form one iperframe of 2.715.648 basic frames TDMA of 3 h 28 m 63 s 760 ms duration. A frame Number FN referred to the frame position in the iperframe is broadcasted within the cell.

FIGS. 3*a* and 3*b* show traffic channel organization in the TDMA multiframes for voice/data and packet data respectively. FIG. 3*a* concerns GSM payload where a multiframe of 26 basic frame includes: 24 traffic frames (T), 1 associated control frame (A), and 1 idle frame (−). A physical channel inside a multiframe is constituted by the combination of one frequency and one repetitive time slot. A burst of FIG. 2 generates a period of RF carrier which is modulated by the relevant data stream. A burst therefore represents the physical content of a timeslot.

FIG. 3*b* concerns GPRS payload where a multiframe of 52 basic frame includes 12 radio blocks B0, . . . B11 of 4 basic frames each, intercalated with an idle frame (X) every three radio blocks. A radio block is carried on a channel defined as above spanning over 4 TDMA frames, so as the mean transmission time of a RLC block is near 20 ms.

FIG. 4 is referred to the GPRS service and shows a mapping of sequential RLC layer blocks into physical layer. Each RLC block includes a block header BH of variable length, an information field comprising data coming from the upper layer LLC, and a field Block Check Sequence BCS used for error detection. A single RLC block is mapped into 4 sequential frames of the TDMA multiframe. So until 8 users can be interleaved in the period of a radio block.

GSM's payload timeslots are allocated one to one to the different users, both in uplink and downlink, while as far as concerns GPRS service a flexible allocation is available. More precisely: 1) GPRS's payload timeslots are independently allocated in uplink and/or downlink; 2) singular users can take advantage of multislot allocation; 3) each configured data packet physical channel PDCH (timeslot) can be advantageously shared among different users which access it on the basis of appropriate priority rules. The MAC layer of GPRS protocol has appropriate procedures for governing dynamic allocation of the resources. Control messages to set up or set down a connection activate said procedures for packet data transfer. Temporary Block Flows (TBF) are connections set up on physical layer by the MAC procedures, they include memory buffers to accommodate the queues of RLC/MAC radio blocks. Each TBF connection allows unidirectional point-to-point transfer of user data and signaling between a mobile station and base station, or vice versa. A TBF connection is held for the only transfer of all the RLC/MAC blocks of a LLC protocol session. The network assigns to each TBF connection a respective Temporary Flow Identity named TFI identifier by associating a field in the header of RLC/MAC blocks. The mobile stations shall assume that TFI identifier is unique for uplink or downlink concurrent TBFs (i.e. assigned to the same MS/UE). The header of RLC/MAC blocks further includes fields to specify direction and type of a control message.

In case of dynamic allocation of the resources and in presence of at least one uplink TBF connection, the header of each RLC/MAC block transmitted downlink includes an Uplink State Flag field (3 bits) named USF written from the network to enable the uplink transmission of a successive radio block from one out M mobile stations which share the same uplink PDCH channel.

GSM-GPRS system bears three classes of operation for mobile stations: a class A mobile operates with GSM and GPRS simultaneously; a class B mobile watches GSM and GPRS control channels but can operate only a set of service at a time; finally a class C mobile only uses GPRS services. Furthermore physical resources at the Um interface can be shared between speech and packet data services on the basis of traffic charge at the initial cell planning.

GPRS service bears Quality of Service (QoS) to assure among other things the following requirements: respect of a negotiated priority of service, service reliability, guarantee of a fixed end-to-end packet transfer delay, guarantee of medium and peak throughput in conformity with a certain multi-slot class. QoS parameters together with A, B, and C classes of operation and class of multislot capability take part in a User Profile made known to the network during GPRS attach.

A generic cellular telephony system suffers a lot of impairments mainly due to the following causes:

1. The peculiarity of radio propagation in conformity with the typology of the cells.

2. The Mobility of the Users

3. The intrinsic frequency reuse.

An impairment due to the first cause of above is the time dispersive behavior of the propagation medium because of non-linearities which distort the original shape of transmitted pulses, causing intersymbol interference due to the pulse spreading over adjacent symbol intervals. Another impairment descending from the same cause is undoubtedly multipath fading due to the random presence of spotted atmospheric diffusers on the radio path introducing statistical behavior on the radio propagation. Both at MS or BTS receiving antennas, various phase-shifted echoes of a transmitted signal coming from multipath are summed up with random distributed phases. The result is an amplitude envelope attenuated below certain levels during corresponding fade durations taken as observation times. The time-varying fading behavior is a statistical process whose probability density follows the Rayleigh distribution. Multipath fading is spectrally characterized to be either flat or frequency selective (notch), this happen respectively for correlated or uncorrelated scattering and in both the cases it generates burst errors. Last shortcoming of an on air interface is its vulnerability due to the easiness of malicious interception of data and conversations, if not otherwise provided.

Impairments due to the user mobility mainly are: shadow fading (i.e. corner), Doppler effect, and a certain spreading of Time Of Arrivals (TOA) of RF signals at the BTS antenna because of the various distances of the mobile stations. Shadow fading is caused by the incoming of an obstacle along the line of sight propagation. By shadow fading the transmitted RF signal undergoes an additional steep attenuation to the usual path attenuation. Doppler effect is a slight frequency shift proportional to the speed the mobile station; the shift introduces noise phase and makes time-variant the channel response. Doppler effect for the highest speeds disturbs the synchronization process and the estimate of the channel pulse response consequently. The spreading of the TOAs force the realignment of the RF signals at the BTS side.

An impairment due to the frequency reuse is the presence of isofrequential interferent signals coming from the neighbor cells. C/I ratio increases and the quality of the reconstructed signal gets worsen consequently. The smaller are the cells the greater is the allowed traffic throughput but parallely cochannel interference increases due to the heavy frequency reuse.

The finding of strategies effective to neutralize the above causes of misoperation in cellular systems, needs a good knowledge of the various electromagnetic environments. Typical Radiomobile channels have been extensively studied and experimented with large, medium, and small cells. Small urban cells are further subdivided into micro and pico cells (i.e. canyons). Large and medium cells are subjected to a variety of environments, such as: hilly terrain, mountainous, woody, motorway, urban, etc. Starting from the above considerations ETSI standard committee has specified in GSM 05.05 some practical pulse responses for typical radiomobile channels, such as: Hata-Okumura, COST231, TU3, TH, etc. Most recently models have been proposed in which the RF channel is also spatially characterized.

A lot of countermeasures have been introduced into the cellular systems to combat the above drawbacks; the most popular are the following: channel coding—interleaving—ciphering—channel equalization—frame alignment—frame (block) retransmission—slow frequency hopping—power control—intra-cell handover—and lastly link adaptation. They are valid in general so that speech, traffic data, and signaling can take advantage from them. Obviously link adaptation is the countermeasure that mostly impacts the present invention: it can be specialized into speech or data adaptation. Recently link adaptation has been improved in concomitance with the GSM enhancement, but before introducing link adaptation the older countermeasures will be considered.

Channel coding introduces redundancy into the data flow increasing its rate by adding information calculated from the source data in order to allow the detection or even the correction of signal errors introduced during transmission. The result of the channel coding is a flow of code words (i.e. blocks as far as concerns block coding). In the case of speech, for example, blocks of 260 bits each are generated every 20 ms at the output of the 13 kbit/s voice encoder. Block coding with parity and convolution codes, well detailed in GSM 05.03 introduce redundancy increasing the bits from 260 to 456. Coding schemes make generally use of Puncturing Schemes (PS) acting on block convolution codes for keeping only q bits out of pn through a pre-determined rule. Puncturing permits to reach an efficiency ratio (ratio between the number of useful bits in the source sequence and the number of bits actually transmitted) which is limited to fractions of the form p/q, otherwise impossible without puncturing. Parity code adds parity bits to the bits to be convolutionally coded for checking the failure of block convolution code in error correction. For the sake of completeness a so-called Fire code is prevalently used in fast signaling channel bursts (in-band FACCH) and BCS Header field of GPRS. Fire code is a gender of cyclic code which adds redundancy dedicated to the detection and correction of "bursty" errors. Since a block convolutional code is mainly used for error correction and error often come out in group, the fire code is used in concatenation and noticeably improves the decoded information. Each type of channel has its own characteristic coding scheme. Channel decoding is performed through a de-convolution process which takes advantage from "soft decisions" delivered from the demodulator. Soft decision is an estimated probability of correctness of each detected bit. A convolutional decoder based on the Viterbi algorithm simply exploits Euclidean metrics to implement soft decisions.

Interleaving consists in mixing up the bits of several code words (code blocks), so that bits which are close to one another in the modulated signal are spread over several code words. Since the error probability of successive bits in the modulated stream is very much correlated, and since channel coding performance is better when errors are de-correlated, interleaving aims at de-correlating errors and their position in code words. In the case of speech, the preceding 456 code bits are reordered and partitioned and diagonal interleaved with 8 timeslot depth to spread the burst errors over more bursts maintaining a reasonable delay of about 37,5 ms (65 burst periods). De-interleaving is the opposite operation.

Ciphering modifies the content of a code block through a secret recipe known only by the mobile station and BTS station. The original content (2×57 bit semi-bursts) is encrypted by summing bit by bit to a ciphering flow. De-ciphering is the opposite operation. Ciphered coded blocks are differentially encoded before modulation to prevent error propagation.

Frame alignment takes advantage from Burst formatting which adds some binary information to the ciphered code blocks of 2×57 bit semi-bursts in order to help synchronization and equalization of the received signal and fast signaling. FIG. 2 shows that the added information include: 26 bit training sequence, 3+3 TB tail bits, and 1 stealing flag bit for each 57 bit semi-burst (total 8 bits for the 20 ms speech block) indicating either the semi-burst contains user data or is used in fast associated signaling mode (FACCH). The transmitted training sequence (known to the receiver) has a central peak in its autocorrelation function whose detection from the receiver allows the burst synchronization. Frame alignment is governed by the BTS which measures the TOAs of all the received RF bursts and sends to each mobile station a respective command forcing a delay in the start of transmission in order to maintain constant three frame offset between uplink and downlink bursts.

Channel equalization usually tempts to reshape the received pulses in order to reduce the intersymbol interference before the demodulation. Contrarily to this definition, an equalizer based on Maximum Likelihood Sequence Estimation (MLSE) criteria, as that based on the Viterbi algorithm, doesn't attempt to equalize the channel in strict sense, but rather uses the knowledge of the channel pulse response (get from the training sequence estimation) to find the data sequence transmitted with the maximum probability. In this area the most recent techniques use beamforming for estimating space and time channel responses. This allows to position the most incoming RF energy towards the directions of the useful signal and its echoes, to the detriment of cochannel interferents. The result is an optimized channel pulse response.

Block retransmission under Automatic Repeat Request (ARQ) scheme when a code block (different from speech) undergoes one or more residual errors.

Slow Frequency Hopping (SFH) is a gender of frequency diversity technique descending from the aptitude of Rayleigh fading to be uncorrelated with frequencies spaced sufficiently apart: i.e. 1 MHz. SFH is the interchangeability of the carriers assigned to the physical channels timeslot by timeslot. SFH is carried out inside an orthogonal set of frequencies in use into a cell; the hops are matched between MSs and BTS because of FDD duplexing. For this aim the system refers to a hopping sequence generation algorithm (detailed in GSM 05.02) which uses an index MAIO (Mobile Allocation Index Offset) linked to the Frame Number FN.

Power control (detailed in GSM 05.08) is a BSS procedure which step by step modifies, within some range, the uplink/downlink RF transmission power. Power control is based on SACCH Measurement Result message and remedies for path loss and shadow attenuations, further improving spectral efficiency by reducing the overall interference of the system. Secondly it extends battery life of the mobile stations.

Intra-cell handover (detailed in GSM 05.08) is a particular case of the handover procedure charged to switch the mobile station on a free channel of the same cell when transmission quality drops below a given threshold. If an intra-cell handover is successfully the radio link failure can be avoided.

As already outlined, GPRS service has been added to the GSM in order to achieve higher performance with data handling. The introduction of packet switching capability meets this objective. TABLE 1 of the APPENDIX shows four standard GPRS coding schemes CS-1 to CS-4 relevant to a RLC block. One block of 456 coded bits carries one radio block. CS-1 consists of a half rate convolutional code for FEC and a 40 bit FIRE code for BCS (and optionally FEC). CS-2 and CS-3 are punctured versions of the same half rate convolutional code as CS-1 for FEC. CS-4 has no FEC. Traffic channels exploit CS-1 to CS-4 while signaling channels prefer CS-1. Practical data-rates (kbit/s) achievable on a single GPRS time-slot are shown in the last column of Table 1.

A subsequent goal of GPRS specifications has been that to increase the data-rate. This aim has been reached by an Enhanced GPRS (EGPRS) version characterized by a higher modulation level, namely 8-PSK (Phase Shift Keying) in combination with additional five coding schemes. In case of 8-PSK modulation a block of 1368 coded bits (456 coded symbols) carries one radio block. While the only GMSK modulation allows to the GPRS users a theoretical bit-rate spanning between 9 and 150 kbit/s (the higher bit-rate being obtained with the poor coding scheme CS-4 and all the eight available time-slots), the 8-PSK modulation allows to the EGPRS users a theoretical bit-rate until 450 kbit/s, triplicating the previous one. In the new EGPRS context, because of the choice between two type of modulations, namely GMSK and 8-PSK, an assignment message shall specify both Modulation and Code type assigned to the channel. Nine combinations of Modulation and Coding Schemes, MCS-1 to MCS-9, are foreseen and detailed in GSM 05.03, GSM 05.04, and GSM 04.60.

TABLE 2 of the APPENDIX shows: code rate, data rate, number of coding bits, etc. concerning EGPRS MCS-1 to MCS-9 schemes. In TABLE 2 the column HCS means Header Check Sequence, while the column Family will be explained later. New EGPRS service thanks to the nine MCSi combinations offers several more opportunities for packet data link adaptation. From TABLE 2 it can be observed that for each type of modulation the grater the code-rate, the greater is the data-rate, because code-rate represents the ratio between the number of useful bits in the source sequence and the number of coded bits. Considering burst having fixed length it results that the higher the code-rate, the poorest is the protection against errors. Higher level modulations (like 8-PSK) are more sensible than lower level modulations (like GMSK) to the causes of RF link degradation and similarly higher code-rates in comparison with lower code rates. Greater sensibility also means faster worsening of the signal delivered to the users as the quality of the RF link worsen. Nevertheless the enhanced opportunity to select one out several combinations of modulation and coding schemes (MCS), enables the system to switch among the various MCSs during run-time to combat the variability of the RF channel. Link adaptation is just this behavior! TABLE 2 doesn't limit the present invention which is valid also in presence of different high level modulations variously combined with the same or different coding schemes.

Link adaptation oriented to voice services promote speech quality compatibly with the variable conditions of the RF link; on the contrary link adaptation oriented to packet data services promotes higher throughputs. In both cases a compromise between data-rate and quality of transmission shall be inevitably pursued when selecting a new modulation and coding scheme. Quality of transmission, and more in general quality of service, plays a main part in a radiomobile system which normally attempts to optimize its own operation by constantly monitoring a lot of parameters. For this aim a variety of measures directed to uplink and downlink transmissions are usually performed, such as (with reference to the single MS): delay of synchronization, channel pulse response, power level of the modulated carrier, power level of the interferent signals, carrier to interferences power ratio (C/I), signal to noise power ratio (S/N), Bit Error Rate (BER), Bit Error Probability (BEP), etc. Incoming useful and interferent signals from the neighbor cells are even monitored to compile a candidate list for handover. The measures performed by the mobile stations are provided by using the PACCH channel; these measures are joined to those performed directly by the BTS and sent forward to the BSC to enable its control capability in the opposite direction. The performed measures give support to the most known procedures of the radiomobile system, such as: Cell selection and reselection, Timing advance, Power control, Handover, Backward Error Correction (BEC) with or without retransmission under ARQ, link adaptation, etc.

Transfer of information relevant to voice, data, signaling, and short messages through the Um interface is governed by a standard protocol named Link Access Protocol for "D" channel modified (LAPDm) for the specificity of the radio channel (high error ratio, fixed length frame, etc.); the same information across the Abis interface undergo an LAPD protocol which descends from the High level Data Link Control (HDLC) procedure. To enable a correct flow control both LAPDm and LAPD deal with numbered frames having start/end flags and payload/signaling content. Henceforth packet data transmission will be only considered, because voice/data link adaptation is not particularly relevant for the invention in subject. Consequently the remaining part of the disclosure will be preferably referred to the GPRS/EGPRS improvement of the GSM. Decisions concerning link adaptation for packet data shall be inevitably issued from a high level protocol agent having the supervision of the signaling conveyed through the uplink TBFs and the opportunity to send command through downlink TBFs. The PCU functional block inside the BSC controller of FIG. 1 represents a unit charged to manage RLC/MAC blocks and consequently take high level decision about link adaptation. Two different modes of operation are foreseen in the RLC/MAC protocol: acknowledged mode and non-acknowledged mode.

Acknowledged mode (non-transparent service). Transfer of RLC Data Blocks in the GPRS acknowledged RLC/MAC mode is controlled by a selective ARQ mechanism coupled with the numbering of the RLC Data Blocks participating a Temporary Block Flow. The sending side (the MS or the network) transmits radio blocks within a window and the receiving side sends either Packet Uplink Ack/Nack or Packet Downlink Ack/Nack message when needed. Every such message acknowledges all correctly received RLC Data Blocks up to an indicated block sequence number (BSN), thus "moving" the beginning of the sending window on the sending side. Additionally, a bitmap that starts at the same RLC Data Block is used to selectively request erroneously received RLC Data Blocks for retransmission. The sending side then retransmits the erroneous RLC Data Blocks, eventually resulting in further sliding the sending window. The RLC acknowledged mode shall be used for data applications where the payload content needs to be preserved. It will be the typical mode for Background class (background delivery of e-mails, SMS, download of databases) and Interactive class applications (web browsing). In EGPRS TBF the transfer of RLC Data Blocks in the acknowledged RLC/MAC mode can be controlled by a selective type I ARQ mechanism, or by type II hybrid ARQ mechanism dealing with Incremental Redundancy (IR), both coupled with the numbering of the RLC Data Blocks within one Temporary Block Flow. In the type I ARQ mode, decoding of an RLC Data Block is solely based on the prevailing transmission (i.e. erroneous blocks are not stored). In the type II hybrid ARQ case, erroneous blocks are stored by the receiver and a joint decoding with new transmissions concerning original blocks is done. If the memory for IR operation run out in the MS, the MS shall indicate this by setting an LA/IR bit in the EGPRS PACKET DOWNLINK ACK/NACK message. Type II hybrid ARQ is mandatory in EGPRS MS receivers.

Non-acknowledged mode (transparent service). The transfer of RLC Data Blocks in the unacknowledged RLC/MAC mode is controlled by the numbering of the RLC Data Blocks participating one Temporary Block Flow, it does not include any retransmissions. The receiving side extracts user data from the received RLC Data Blocks and attempts to preserve the user information length by replacing missing RLC Data Blocks by dummy information bits. Delay sensitive services, such as Conversational class (voice, video conference) and Streaming class applications (one-way real time audio and video) will make use of the RLC unacknowledged mode. The same mechanism and message format for sending temporary acknowledgement messages is used as for acknowledged mode in order to convey the necessary control signaling (e.g. monitoring of channel quality for downlink channel, or timing advance correction for uplink transfers). The sending side (the MS or the network) transmits a number of radio blocks and then polls the receiving side to send an acknowledgement message. A missing acknowledgement message is not critical and a new one can be obtained whenever.

Quality of Service (QoS), see GSM 03.60, takes advantage from both transparent or non-transparent transmissions, as indicated for the services listed above. The two transmission modes differently impact the two QoS classes concerning point-to-point delay and throughput. Unacknowledged packed data is characterized by a fixed point-to-point delay and a variable gross bit-rate, mainly due to the system attempts to maintain a target user bit-rate with the required quality. Acknowledged packed data is characterized by a variable point-to-point delay due to retransmission and a constant gross bit-rate; in the last case the result is a variable user bit-rate which can be calculated with the following known expression:

$$\text{Throughput}_{NET} = \text{Throughput}_{MAX}(1-BLER) \quad (1)$$

where: $\text{Throughput}_{NET}$ is the net user bit-rate; $\text{Throughput}_{MAX}$ is the peak user bit-rate; and BLER is the Block Error Rate on the current Modulation and Coding Scheme (MCS).

Link adaptation is applicable in packet data transmission independently on the acknowledged or unacknowledged transmission modes. Other questions about link adaptation are the following:

effect of frequency hopping on link adaptation;
  the effect of incremental redundancy;
  compatibility of the link adaptation with power control.

These questions are briefly discussed in the following.

Frequency hopping increases the variability of the channel so that the choice of an idoneous MCSi shall be conditioned consequently, for example channels having higher variability should require more robust MCSs and consequently lower throughputs.

Incremental redundancy pertaining to type II hybrid ARQ, differently from type I ARQ, needs a lot of memory to store erroneous block together with multi-bits soft decisions usable in joint decoding the successive retransmitted bits. The overflow probability of an IR buffer de facto increases with the less robust MCSs at the lowest C/I; when this happens lastly stored blocks are discarded and BLER starts to increase. The capacity to contrast worsening of the service clearly depends from the skill of link adaptation to manage this circumstance.

Both Link Adaptation and Power Control are features that aim at network optimization but, if run independently, may lead to a contrasting situation. Link Adaptation tries to optimize performance (i.e. maximize throughput) for a given radio link quality. This means that if, for instance, radio conditions are improved, the known methods of Link Adaptation try to benefit from this situation and increase the overall throughput by switching to a different (less protected) coding scheme. On the contrary Power Control tries to reduce interference and save power by using the least possible transmit power suitable to achieve a specified C/I ratio (which is consistent with a required minimum performance). In other words PC tends to keep constant the radio link quality thus inhibiting further improvements due to the LA algorithm. Therefore a common strategy has to be decided to make LA and PC work together.

DEFECTS OF THE PRIOR ART

Patent application WO 99/12304 discloses a method for selecting a combination of modulation and channel coding scheme from a plurality of combinations of modulation and channel coding schemes. Main purpose of the cited invention is that of calculating, other than the usual averages of the oldest methods, also the variance of the measured quality parameters relevant to the RF link, i.e: C/I, BER, BLER, RX-level, time dispersion, and data throughput, for the precise aim to consider the variability of the RF channel when performing a dynamic link adaptation. An evident drawback of the method is the cumbersome off-line tables which map the mean values and variances of the measured parameters into corresponding BLERi for all the MCSi. That because each table of the type BLERi(C/I), or BLERi(BER), etc. shall foreseen entries for two variables and one output for providing the BLERi; e.g. BLERi(average C/I, variance). So the complete input has reasonably to keep into account several possible variances for each mean value considered in a significant grid. The more complicated are the mapping tables the more they suffer from sensitivity of the parameters, consequently the empirical representation of a certain BLERi requires to guess exact combinations of mean and variance. Another feature added to the independent claims concerns the determination of an optimal transmit power level for each MCSi scheme previously selected by link adaptation. The optimal power is determined based on the measured C/I and its level is limited by a dynamic range of the power transmitter. In that the optimal transmission power is dependent on the selected MCSi and requires the definition of as many C/I target as the MCSi.

U.S. Pat. No. 5,764,699 discloses a method of adaptively selecting from amongst at least two data modulation techniques to use when transmitting data, comprising the steps of:

in a first two-way communication unit:
  maintaining stored information regarding quality of previous transmissions of data;
  transmitting to a second two-way communication unit at least one block of data using a first data modulation technique from said at least two data modulation techniques;
  receiving from the second two-way communication unit at least a selective automatic-repeat-request feedback message;
  automatically selecting, as a function of both information contained in the selective automatic-repeat-request feedback message and the stored information, a second data modulation technique from said at least two data modulation techniques;
  updating the stored information to include at least some of the information contained in the selective automatic-repeat-request feedback message; and
  using the second data modulation technique for subsequent transmissions of data.

The method of above implements link adaptation combined with Incremental redundancy. Another similar embodiment is disclosed for transparent services. In both the cases a plurality of different quadrature modulation schemes (QPSK, 16, 64, or 256-QAM) are provided for a unique coding scheme; in that link adaptation is performed by the variation of the sole modulation schemes rather than Modulation and Coding Schemes as in GPRS. The criterion to change modulation disclosed in the text of the citation consists of averaging the BLER of the actual Modulation and comparing the current average with a set of threshold values stored in a memory of the radio unit employing the method, preferably the transmission unit. Each of the possible modulation techniques has a defined upper and lower BLER threshold value that delimit a region in which the technique outperforms any other techniques. The averaging of the BLER makes use of one or several possible weighting factors to weigh recent quality information more than older information. Channel quality history is kept in a database located preferably at the transmitting end for the aim of averaging the BLER, with the database being updated after each transmission upon the reception of a feedback message that contains information as to which data blocks were received with errors, and which were received error-free. Alternate embodiments might require updating the database on a selective basis, e.g. only after a significant change. A first drawback of the method disclosed in the above patent document is that of performing link adaptation without discriminating, as far as concerns the BLER threshold values, between transparent and non-transparent transmission mode, either implementable for the same modulation scheme. A second serious drawback is that do not adequately exploit the opportunities offered by a single Modulation cause the lack of a combination with different coding schemes; in that the use of more onerous higher modulations is forced also when link adaptation could be carried out without changing the actual modulation but simply combine it with another coding scheme.

Patent application WO 00/49760 provides an exhaustive presentation of the problematic around Incremental Redundancy together with link adaptation; its teaching has been taken into GSM 04.60. A main problem solved by this invention is that of providing suitable overhead signaling messages to enable dynamic changing of the MCS during a connection, taking into account contrasting exigencies between Incremental Redundancy and pure Link Adaptation. A first type of said overhead messages is named LA/IR and corresponds to an additional bit inserted as a flag by the transmitting entity (i.e. the mobile station) in a control word of the RLC control blocks periodically transmitted in uplink to the receiving entity (the network). The LA/IR message provides an explicit request of the preferred operating mode, i.e. either link adaptation or incremental redundancy. This information can then be used by the network when selecting one of two predetermined rules for changing the MCS. For example, if the mobile station MS transmits the LA/IR field with a value which indicates that incremental redundancy is preferred, this implies that it currently has adequate memory capacity to continue to store blocks to support IR combining. This informs the network that the BTS can employ an MCS scheme more aggressive (less robust), taking the link quality estimate report into account. Alternatively, the LA/IR field may instead have a value which indicates that link adaptation is preferred by the mobile station. This may imply that the Mobile station lacks available memory and, therefore, cannot rely on incremental redundancy combining. When the network receives this message may then switch to a second MCS rule makes more conservative (more robust) MCS choices, based on the quality estimates, to ensure that the mobile station achieves sufficient performance without the incremental redundancy combining. Commands to change MCS are enclosed in downlink control blocks. A second type of overhead messages of the two mentioned in WO 00/49760 is the value of an additional bit flag named RSEG/NRESEG by means of that the receiving entity informs the transmitting entity whether the MCS for retransmission should be the same or different than the MCS for new blocks transmissions. Before considering the reasons for sending RSEG/NRESEG message a general description of the MCS opportunities for EGPRS is needed. TABLE 3 of the APPENDIX shows that the EGPRS MCS are divided into different families named A ($A_{padding}$), B and C. Each family has a different basic unit of payload: 37 (and 34), 28 and 22 octets respectively. Different code rates within a family are achieved by transmitting a different number of payload units within one Radio Block. For families A and B, 1, 2 or 4 payload units are transmitted, for family C, only 1 or 2 payload units are transmitted. When 4 payload units are transmitted (MCS-7, MCS-8 and MCS-9), these are split into two separate RLC blocks (i.e. with separate sequence numbers and BCSs) within the same Radio Block. These blocks in turn are interleaved over two bursts only, for MCS-8 and MCS-9. For MCS-7, these blocks are interleaved over four bursts. All the other MCSs carry one RLC block interleaved over four bursts. When switching to MCS-3 or MCS-6 from MCS-8, 3 or 6, padding octets, respectively, are added to the data octets. The highlighted structure of the MCSs schemes offers more than one retransmission opportunity to cope with change in the RF channel, for example it's possible under certain restriction, that the message originally pertaining one radio block be retransmitted with more, or less, robust MCS scheme. A change of MCS for the retransmitted message involving a splitting of the payload is said re-segmentation. In case the receiving entity were the network, the downlink control blocks transporting a suitable message include an MCS command which tells the mobile station which MCS should be used for transmitting uplink RLC blocks. The RSEG/NRESEG bit can also be added to the downlink control blocks. In this context a NRSEG asserted (re-segment bit=0) can be interpreted by the mobile station as meaning retransmissions by the mobile station using the same MCSs as the initial transmissions of RLC blocks; on the other hand a NRSEG negated (re-segment bit=1) should be interpreted by the mobile station as meaning that blocks to be retransmitted could be re-segmented and transmitted using different MCSs than the initial one. In the latter case, the specific MCS to use for retransmission can be determined by a predetermined rule stored in the receiving entity (mobile station). A help in retransmission come from ETSI GSM 04.60, paragraph titled "Acknowledged mode operation—Additional functionality in acknowledged EGPRS TBF Mode", in which a procedure is proposed which allows the receiver to operate either in type I or type II hybrid ARQ mode. This procedure says that according to the link quality, an initial MCS is selected for an RLC block. For the retransmissions, the same or another MCS from the same family of MCSs can be selected. E.g. if MCS-7 is selected for the first transmission of an RLC block, any MCS of the family B can be used for the retransmissions. Further, RLC data blocks initially transmitted with MCS4, MCS-5, MCS-6, MCS-7, MCS-8 or MCS-9, can optionally be retransmitted with MCS-1, MCS-2 and MCS-3 respectively, using two radio blocks. In this case, the Split Block indicator (SPB) in the header shall be set to indicate that the RLC data block is split, and the order of the two parts. For blocks initially transmitted with MCS-8 which are retransmitted using MCS-6 or MCS-3, padding of the first six octets in the data field shall be applied, and the Coding and Puncturing Scheme (CPS) field shall be set to indicate that this has been done. However, if the transmitter side is the MS and the re-segment bit is not set, the mobile station shall use an MCS within the same family as the initial MCS without splitting the payload for retransmission. The RLC data blocks shall first be sent with one of the initial code rates (i.e., the rate 1/3 encoded data is punctured with the Puncturing Scheme (PS) 1 of the selected MCS). If the RLC Data Block has to be retransmitted, additional coded bits (i.e., the output of the rate 1/3 encoded data which is punctured with PS 2 of the prevailing MCS) shall be sent. If all the codewords (different punctured versions of the encoded data block) have been sent, the procedure shall start over and the first codeword (which is punctured with PS 1) shall be sent followed by PS 2 etc. RLC data blocks which are retransmitted using a new MCS shall at the first transmission after the MCS switch be sent with the puncturing scheme indicated in the APPENDIX—TABLE 4. Furthermore, it is mandatory for an EGPRS MS receiver to be able to perform joint decoding among blocks with different MCSs if the combination of MCSs is one of the following: MCS-5 and MCS-7; MCS-6 and MCS-9. The long explanation of the LA/IR technique attends to clarify this complex argument at the advantage of the disclosure of the invention which is the subject of the present application, besides the lack in the second U.S. Pat. No. 5,764,699 citation of some indications useful to understand the influence of the IR mechanism on the decisional thresholds of BLER is better highlighted. On the other hand is quite evident that the incremental redundancy impacts the extension of the BLER regions and it needs some expedients to be correctly implemented together with link adaptation. The only reasonable inference on IR over LA from the teaching of WO 00/49760 is that IR take over pure LA in case of retransmission with infinite memory pad, but considering the more realistic case of memory saturation, LA is also activated to avoid frequent retransmission. There is a sort of pronounced antagonism between LA and IR at the lower C/I, and the higher BLER values are involved consequently. A problem to be solved by a link adaptation based on comparison with BLER thresholds is that of how taking realistic thresholds in presence of IR for maximizing data throughput. The prediction of LA/IR interactions is not an easy task at all, because, beyond the probabilistic nature of the phenomenon, the knowledge of the precise retransmit memory size is also required. Memory size at the mobile station side depends on the customer preferences about costs and dimensions of the apparatuses and can't be planned by BSS producer consequently. The problem of taking realistic BLER thresholds is further dramatized by the need of taking into account the effect of the variability of the RF channel other than Incremental Redundancy (IR).

With reference to the three aforementioned citations, the effect of the variability of the RF channel on link adaptation is now investigated. As known, the channel variability mainly depends on the presence of slow frequency hopping and/or high user mobility. The problem of the channel variability had been already considered in WO 99/12304 and solved in three steps:

a first step for off-line generating two-entries and one-output mapping tables in correspondence of each MCSi. Two-entries correspond to possible combinations of average and variance of C/I quality values, and the output provides the corresponding BLERi;

a second step for measuring the average C/I and the relative variance with an initial MCSi; and a third step to see how the BLERi for other MCSi would have been for the same channel conditions, in order to establish in base to the known relation:

$$Ti = Ti_{MAX}(1 - BLERi) \qquad (1)$$

if a change of MCS is needed towards one MCSi having higher throughput Ti.

The given solution, thanks to the calculation of the variance of the measured set, is really able to catch the variability of the RF channel. This performance nevertheless requires a great deal of off-line simulations, cumbersome run-time measuring and mapping steps, and run-time calculation of the relation (1) for the selection of the right MCSi. Nothing is said of how has to be considered the effect of the Incremental Redundancy on the whole method.

The method of U.S. Pat. No. 5,764,699 document apparently doesn't suggest any valid solution to the problem of how contrasting the variability of the RF channel, other than the usual calculation of the averages of historical quality values duly weighted for smoothing older information. The run-time advantage of the U.S. Pat. No. 5,764,699's adaptation method in respect of the method disclosed in WO 99/12304, is mainly due to the easier and quicker change of modulation which is established by a simple comparison with two tabulated thresholds. The run-time advantage pays the prize of the poor capacity to catch the variability of the RF link because the variance is not calculated.

Also the method of WO 00/49760 document apparently doesn't suggest any valid solution to the problem of how contrasting the variability of the RF channel in presence of Incremental Redundancy together with link adaptation.

SUMMARY OF THE INVENTION

A main object of the present invention is that to remedy to the defects of the prior art, in particular the one making use of BLER thresholds for dynamically optimize data throughput at the radio interfaces of a packet data cellular network, and indicate an improvement for taking into account the effect of slow frequency hopping and/or high user mobility.

Other object of the invention is that of further optimizing data throughput at the radio interfaces in presence of retransmission with incremental redundancy of the bad received radio blocks.

Further object of the invention is that to harmonize power control and link adaptation mechanisms jointly active at the radio interfaces.

To achieve said objects the subject of the present invention is a method for dynamically optimize data throughput at the radio interfaces of a packet data cellular network. The method of the invention provides an additional set of tabulated thresholds for considering RF channels with high variability. The additional set is particularly appreciable in presence of frequency hopping, that because the new thresholds provided for the BLER comparison better fit with the effects of an increased variability of the RF channel due to the frequency hopping. The two sets of tabulated thresholds, for channels with or without frequency hopping might be preferably both allocated to the BSS (PCU) and either enabled in the occurrence.

The approach taken for frequency hopping is extended to consider all the possible practical RF scenarios. It has been noticed that the simulation results can be grouped into few significant cases. For instance in a typical urban environment two only different cases can be taken into account:, namely: a "low diversity" scenario and a "high diversity" scenario. A first set of thresholds for the "low diversity" scenario should be selected if the cell is characterized by a low user mobility, such as: pico-cells, indoor cells, etc., without Frequency Hopping. A second set of thresholds for the "high diversity" scenario should be selected instead if the cell is characterized by a higher user mobility, such as: ≈50 km/h mobile speed, or if Frequency Hopping is enabled. The method of the present invention provides the two set of thresholds for "high diversity" and "low diversity" RF channels, in that resolving the problem of the variability of the RF channel. Relevant prior art is silent about a difference on the thresholds delimiting a BLER region characteristic of a particular modulation for taking into account low and high channel variability. Besides a link adaptation based on the only selection of different modulations doesn't offer as many opportunities as the combination of modulations with different codes.

The approach of the present invention is extended to consider the impact of Incremental Redundancy (IR) on Link Adaptation (LA). The invention solves this complex technical problem starting with introducing a variable called IR_status which gives continuously updated information to the receiving entity (either the network or the mobile station) about the efficiency of Incremental Redundancy, as disclosed in a relative dependent claim. The evaluation of the variable IR_status is quite simple and filtered IR_status values are taken to update the BLER thresholds consequently. Updating is performed by a linear interpolation between two extreme conditions, namely: BLER thresholds relative to lack of IR and BLER thresholds relative to perfect IR. Intermediate and more realistic conditions are automatically managed by the mechanism of threshold updating. The outlined contrasting behavior between LA and IR, since now remarkable source of problems in the determination of the best adaptation strategy, is no more a problem with the method of the invention extended to the Incremental Redundancy. The impact of Incremental Redundancy is either considered for high diversity or low diversity RF channels Last argument of the invention is a modified Power Control algorithm having a different goal then the traditional one. The modified algorithm attempts to maintain a $C/I_{target}$ target value for the duration of the whole TBF. The $C/I_{target}$ target is associated to a Peak Throughput per timeslot decided as "Target performance". The association is performed through a curve that represents the maximum achievable Throughput versus C/I. This curve belongs to those simulated off-line during the preliminary step of the Link Adaptation subject of the present invention, in particular to a set having care of the incremental redundancy. Although the upper goal of Power Control, Link Adaptation continues to adapt to radio conditions, switching from one MCS to another, in order to optimize performance on net throughput. This may happen due to the fact that the power control cannot be "perfect" and therefore the actual C/I ratio may be different from the target one. From above it can be argued that the Modified Power Control algorithm complete the Link Adaptation of the present invention working in synergy with it; in that resolving the outlined controversy of the traditional Power Control. Besides, contrarily to the power control of the first cited document of the prior art, it need not separate optimization for each available MCSs.

From all the above considerations the following substantial advantages of the proposed invention emerge, namely:

link adaptation runs independently on quality measures, however performed on the ongoing RF signal for traditional Power Control and Handover procedures;
the variability of the RF channel is neutralized in advance in the adaptation;
the memory size for Incremental Redundancy is managed in a transparent way;
power control pursues same goal as link adaptation.

BRIEF DESCRIPTION OF THE SEVERAL VIEWS OF THE DRAWINGS

The features of the present invention which are considered to be novel are set forth with particularity in the appended claims. The invention, together with further objects and advantages thereof, may be understood with reference to the following detailed description of an embodiment thereof taken in conjunction with the accompanying drawings given for purely non-limiting explanatory purposes and wherein:

FIGS. 7, 8, 9, 10, 11, 12, 13, 14 show graphic representations of simulation results used to implement the method of the present invention;

APPENDIX—TABLE 1 includes coding parameters for GPRS coding schemes.

APPENDIX—TABLE 2 includes coding parameters for EGPRS modulation and coding schemes.

APPENDIX—TABLE 3 represents payload families used in the EGPRS coding schemes.

APPENDIX—TABLE 4 includes Puncturing Schemes for EGPRS.

APPENDIX—TABLE 5 includes modulation and coding schemes to be used for retransmissions when re-segmentation is not enabled.

APPENDIX—TABLE 6 includes modulation and coding schemes to be used for retransmissions when re-segmentation is enabled.

DETAILED DESCRIPTION OF THE INVENTION

The arguments of FIGS. 1, 2, 3a, 3b and 4, so as TABLES 1, 2, 3, and 4 of the APPENDIX have already been duly discussed above in the text.

Figure 1:
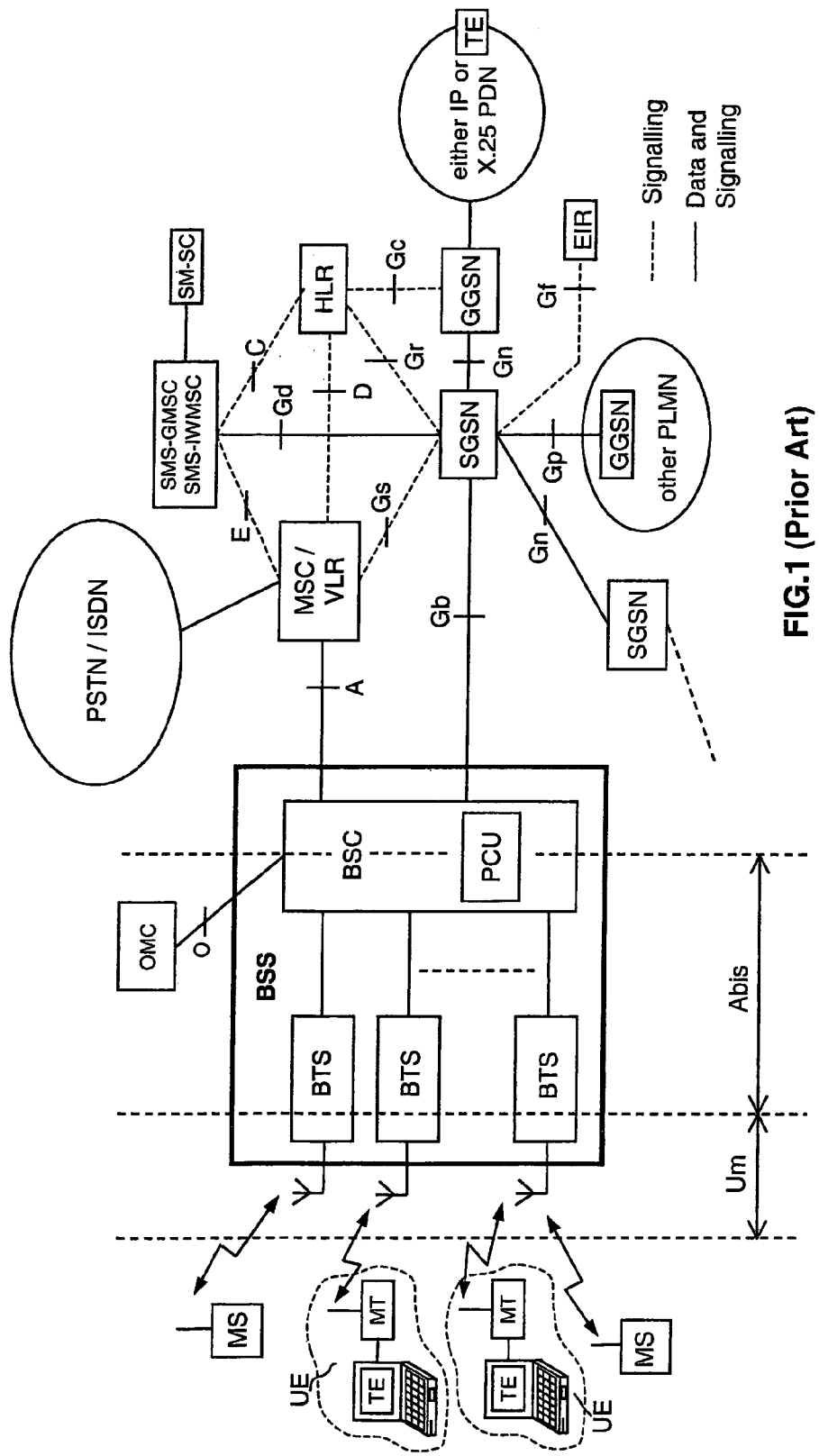
FIG. 1 shows an GSM and GPRS radiomobile network operating in conformity with the method of the present invention.
Figure 2:
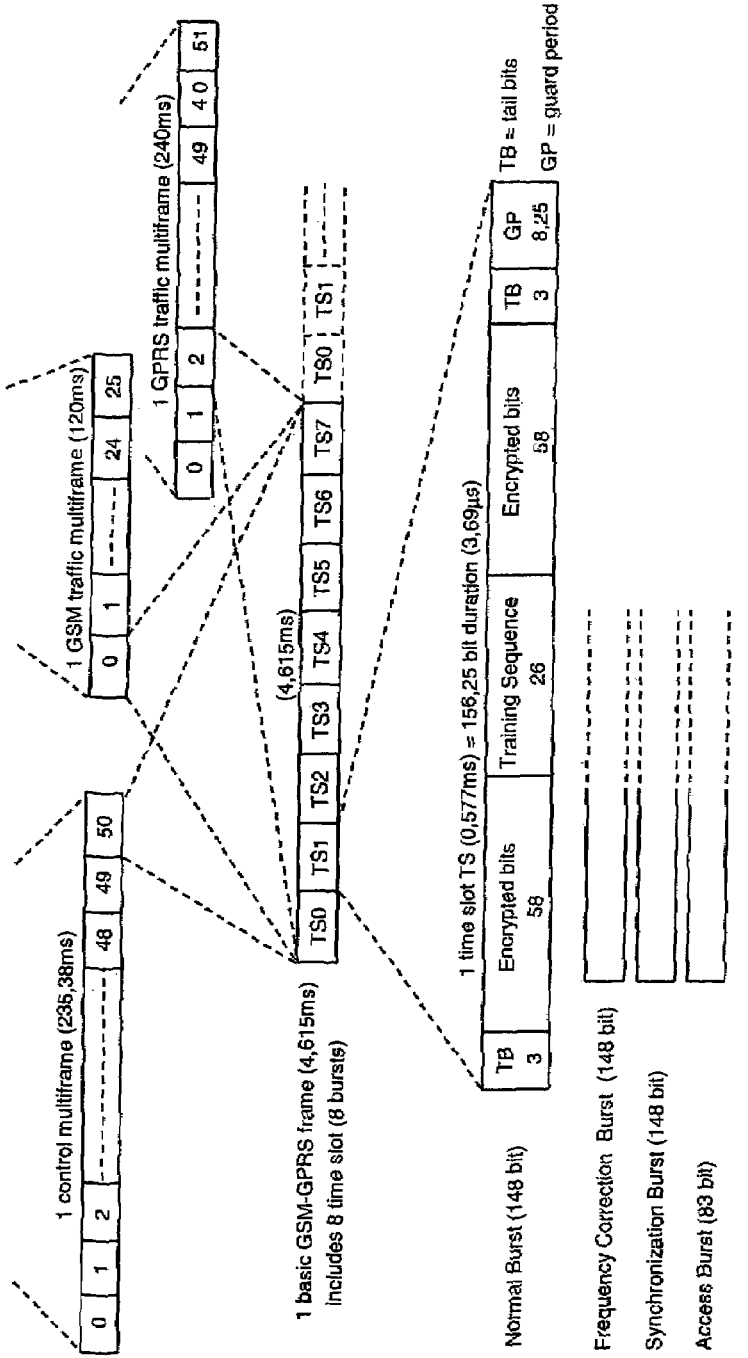
FIG. 2 shows a Time Division Multiple Access (TDMA) multiframe structure common to the GSM and GPRS of FIG. 1.
Figure 3A:
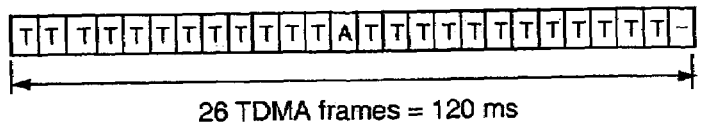
FIG. 3a shows a GSM traffic channel multiframe.
Figure 3B:
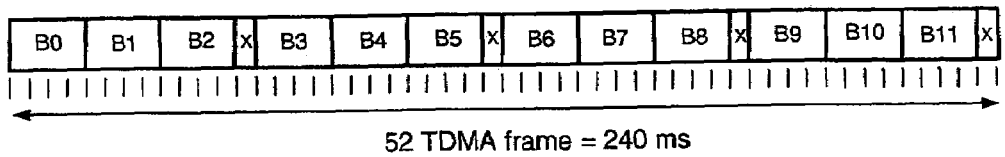
FIG. 3b shows an GPRS traffic channel multiframe.
Figure 4:
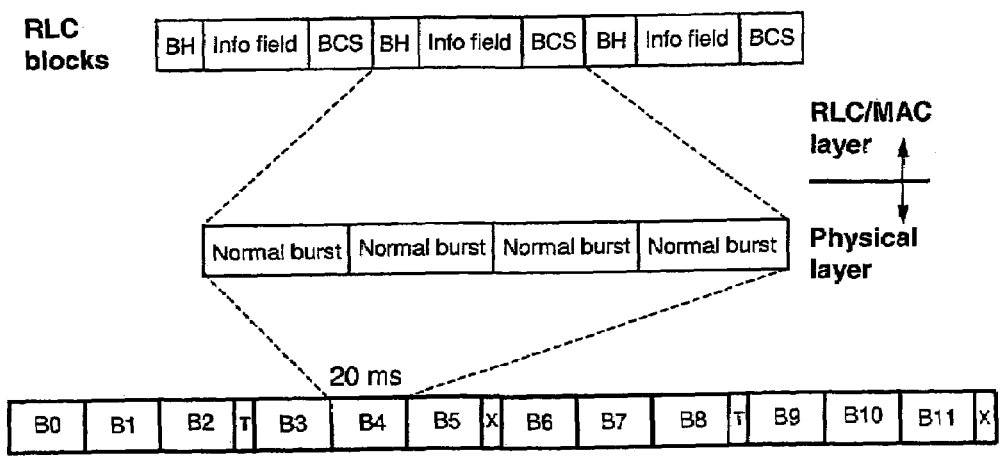
FIG. 4 shows the mapping of higher level frames into radio blocks belonging to the EGPRS multiframe of FIG. 3b.
Figure 5:
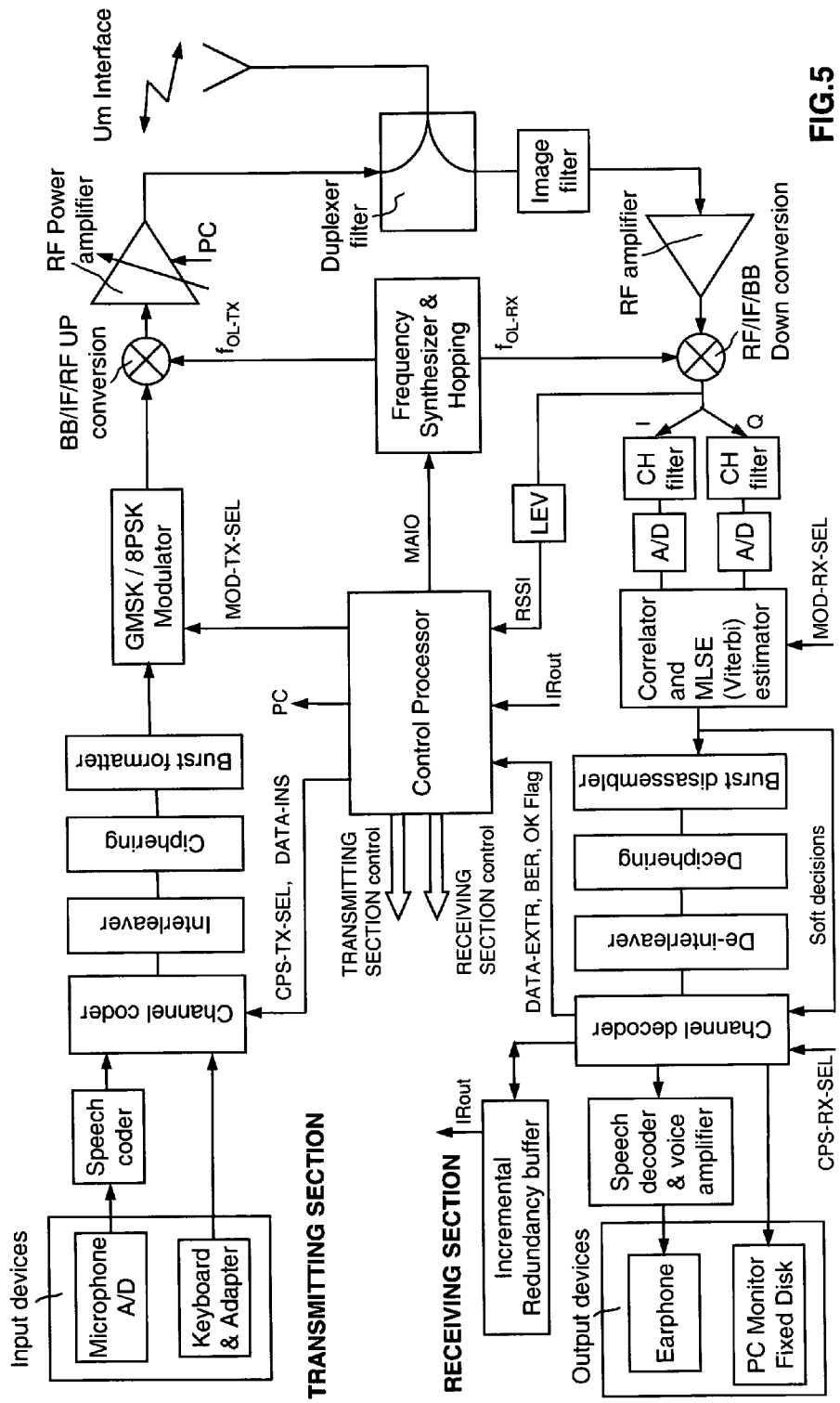
FIG. 5 shows the functional blocks of a mobile station MS/UE of FIG. 1 operating in conformity with the method of the present invention.

FIG. 5 shows a block diagram of a mobile station MS/UE suitable to implement the present invention in conjunction with the BSS subsystem of FIG. 1. The mobile station MS/UE includes a Transmitting Section and a Receiving Section both controlled through a Control Processor that further controls a Frequency Synthesizer & Hopping unit common to the two sections. A Duplexer filter conveys to the antenna the RF output signals of the Transmitting section and to the input of the Receiving section the RF signal received on the antenna. For the sake of simplicity an oscillator and a TDMA timing generator are not shown in FIG. 5. The Transmitting Section includes the following functional blocks: Input devices, Speech coder, Channel coder, Interleaver, Ciphering, Burst formatter, GMSK/8-PSK Modulator, BB/IF/RF UP converter, and RF Power amplifier. Input devices include a microphone with relative A/D converter and a Keyboard & Adapter. The Receiving Section in its turn includes the following functional blocks: Image filter, RF amplifier, RF/IF/BB Down converter, LEV, CH filter, A/D converter, Correlator and MLSE (Viterbi) estimator, Burst disassembler, Deciphering, De-Interleaver, Channel decoder, Speech decoder & Voice amplifier, Output devices (Earphone, PC Monitor, Fixed Disk, etc.). In conformity with its A, B, or C operative class, the mobile station MS/UE is able to operate with both voice and data input devices, simultaneously or not. Class A users have one time slot allocated for speech and one or more others to the EGPRS service. Dual considerations apply to the Output devices. As already mentioned the present invention is prevalently addressed to packet data, so the blocks Input devices and Output devices will exemplify known data terminals for inputting or outputting data respectively. Those terminals include pads and adapter circuits for synchronizing, storing, adapting format and rate of the incoming/outgoing digital blocks. Considering the Transmitting section at first, Channel coder accepts data from Input devices and provides a relevant EGPRS coding scheme, selected from those reproduced on TABLES 1 and 2. For this aim a CPS-TX-SEL signal is outputted from the Control Processor. Channel coder provides for: block code, parity code, convolutional code and fire code; it further accepts and codifies DATA-INS signaling RLC blocks (such as measures) from the Control Processor. Coded blocks are sent to the cascade of Interleaver, Ciphering, and Burst formatter to perform the relative digital treatments as explained in the introduction. A formatted burst is delivered to the GSM/8PSK Modulator which starts performing a differential encoding followed by either a GMSK or 8-PSK modulation. Control Processor selects the modulation type by sending to the Modulator a MOD-TX-SEL signal, always in respect of the MCS schemes listed in TABLE 2. The base band analog modulated signal is firstly translated to IF frequency and then to RF frequency by means of suitable up conversion mixers; each conversion stage is followed by a band pass filtering stage. The RF transmission signal reaches the input of a variable gain Power amplifier whose output is coupled to a transmission port of a Duplexer filter coupled to the Mobile station antenna. The downlink RF signal coming from the BTS reaches the Mobile station antenna and leaves a receiving port of the Duplexer filter, crosses an Image filter and reaches the input of a Reception low noise amplifier whose output is connected to a frequency down converter. The down conversion is carried out by two cascaded stages: a first one converts from RF to IF, and the second one from IF to base band BB. The second stage also splits the converted signal into the in-phase I and in-quadrature Q components. The base band I, Q components are filtered by two channel filters CH matched to the transmitted pulse and then analog-to-digital converted. The two copies of the digitalized reception burst arrive at the two inputs of a Correlator/Synchroniser, acting like a matched filter to the training sequence, which extracts the correlation peak for detecting the initial instant of the transmission. The same correlative process also estimates the pulse response of the channel supplied to an MLSE estimator based on the Viterbi algorithm. This algorithm acts on a sequentially built-up trellis having as many nodes (reiterated at each symbol time T) as the states $S=M^L$ of the receiver, corresponding to all the possible combinations generated from M words (symbols) of a modulation alphabet over L symbol times (where L is the significant length of the initially estimated channel pulse response). Starting from a known initial state, the progressive path along the trellis will depend on the effective transmitted sequence. All the possible transmitted sequences are distinguished each other through a respective path metric which constitutes the Likelihood function to be gradually maximized by accumulating transition metrics. At every new symbol time M transition metrics Δ are calculated in correspondence of the M branches departing from each preceding node to reach a number M of successive nodes. A transition metric (or branch metric) is the Euclidean distance between the level of the received symbol and the level that should have been received in correspondence of a supposed transition on the trellis. Among all the branches departing from a node only a survivor one is selected to prolong a trellis path passing through that node, namely that having the maximum actual path metric. So doing, a drastic cut of the complexity is performed because the original number of states is maintained at each step. Among all the survived paths at the time T the candidate sequence is the one which has the maximum path metric. Going back along the trellis for a certain number of steps it can be appreciate that only a path survives, which is associated to a segment of the transmitted sequence. More precision is obtained delaying the decision of the MLSE estimator until the end of the burst. At the output of the MLSE estimator a copy of the original burst is reproduced and each bit is accompanied with three bits soft decisions indicating its received level. The estimated burst is delivered to a cascade of the following blocks. Burst disassembler, Deciphering, De-interleave, and Channel decoder; the last carries out the specified operations in respect of TABLES 1 and 2 by exploiting soft decisions. Control Processor generates the following two signals: MOD-RX-SEL and CPS-RX-SEL towards MLSE estimator and Channel decoder respectively. That because modulation and/or code scheme of the received signal can differ from the transmitted ones. MLSE estimator operates with either GMSK or 8-PSK modulation, obviously with different trellis and branch metric expression. Channel decoder uses Soft decisions to carry out convolutional decoding and also takes advantage from the mentioned Incremental redundancy strategy supported by an Incremental Redundancy buffer for temporarily storing RLC blocks to be retransmitted under ARQ. A buffer overflow activates a signal IRout directed to the Control Processor. Decoded RLC signaling blocks, indicated with DATA-EXTR, are extracted and sent to the Control Processor for the correct interpretation and execution (such as: Power control, Timing Advance, Handover, etc.). Channel decoder detects and counts errors before error correction and informs the Control Processor by sending a signal BER having the usual meaning of Bit Error Rate. Since decoding is good an OK Flag is set. Decoded RLC blocks concerning traffic are sent to the appropriate output devices in conformity with the selected A, B or C user class. Control Processor governs the main operational procedures of the Mobile station MS/UE through a first and a second group of signals indicated as TRANSMITTING SECTION control and RECEIVING SECTION control, respectively directed to the two sections. Among these signals the following three are pointed out: MAIO, RSSI and PC. MAIO is directed to the Frequency Synthesiser & Hopping unit in order to provide indication for frequency hopping and handover. Signal RSSI is generated from a circuit LEV which samples, A/D converts, and measures the strength of the received signal, and noise during idle. Control Processor block includes a memory RAM for temporarily store Level 2 and Level 3 signaling messages.

Figure 6:
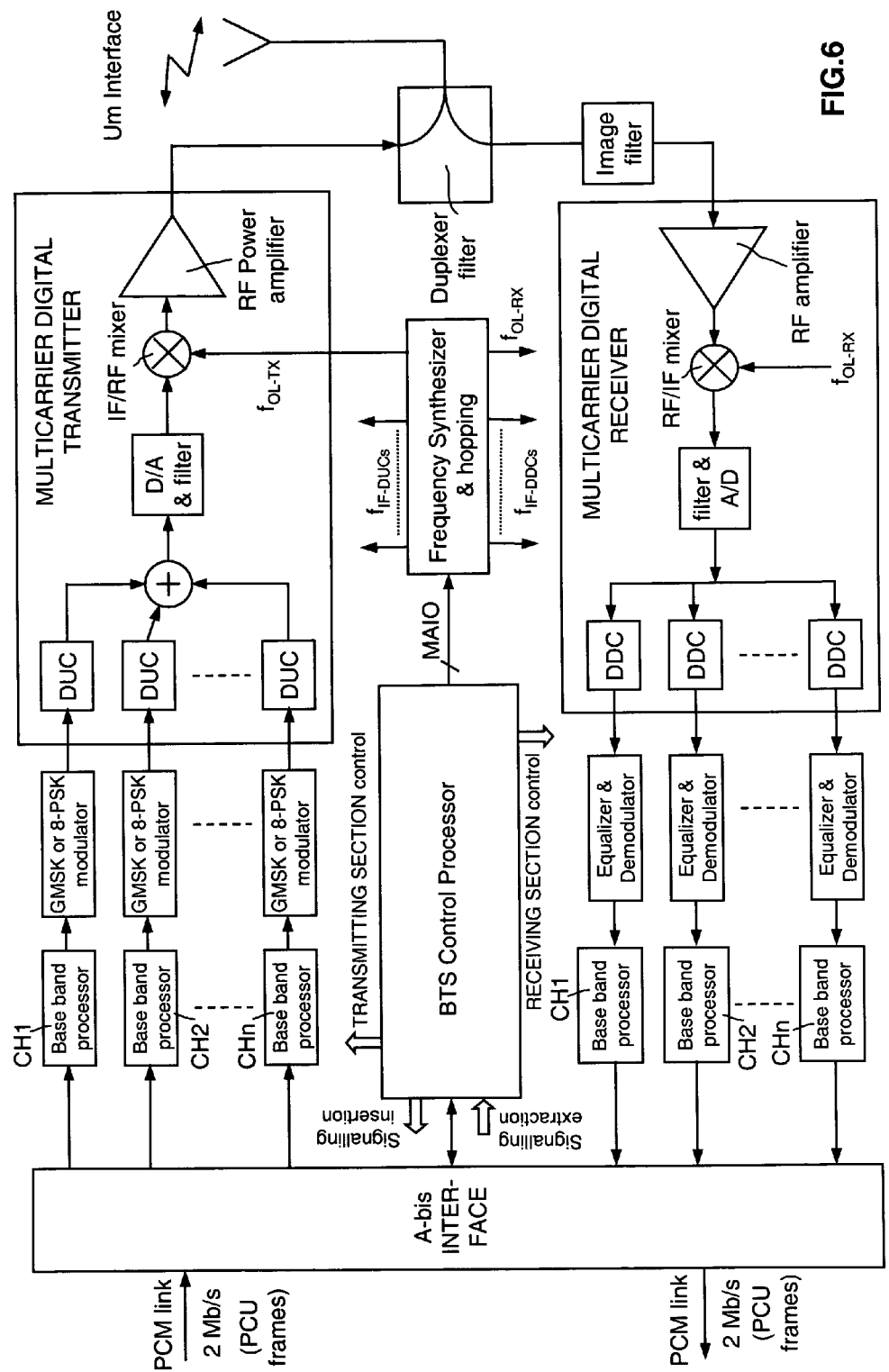
FIG. 6 shows the functional blocks of a base station BTS of FIG. 1 operating in conformity with the method of the present invention.

FIG. 6 shows a block diagram of a Base Transceiver Station (BTS) suitable to implement the present invention in conjunction with the BSS subsystem of FIG. 1 and the Mobile Stations MS/UE of FIG. 5. The mobile BTS includes a Transmitting Section and a Receiving Section both controlled through a BTS Control Processor that further controls a Frequency Synthesiser & Hopping unit common to the two sections. The two Sections and the BTS Control Processor are connected to an A-Bis INTERFACE functional block for receiving/outputting one or more PCM link at 2 Mb/s or PCU frames incoming from or outgoing to the BSC (FIG. 1). A Duplexer filter conveys to the antenna the RF output signals of the Transmitting section and to the input of the Receiving section the RF signal received on the antenna. For the sake of simplicity a clock generator/extractor and a TDMA timing generator are not shown in FIG. 6. The Transmitting Section includes the following functional blocks: Base band processing 1 . . . n, GMSK or 8-PSK digital modulators 1 . . . n, MULTICARRIER DIGITAL TRANSMITTER. The Receiving Section includes the following functional blocks: Base band processor 1, . . . , n, Equalizer & Demodulator 1, . . . , n, MULTICARRIER DIGITAL RECEIVER, and an Image filter. Starting from the Transmitting Section, the A-bis INTERFACE block extracts from the PCM link or PCU frames all the n elementary fluxes concerning CH1 . . . CHn channels relevant to the n users. CH1 . . . CHn fluxes reach respective Base band processors to undergo all the digital treatments as: coding (parity, convolutional fire), interleaving, ciphering, burst formatting, and differential coding. Convolutional coding provides a relevant EGPRS coding scheme, selected from those reproduced on TABLES 1 and 2. The n coded signals outputted from the Base band processors reach as many GMSK/8-PSK digital modulators to be digitally modulated in respect of the MCS schemes listed in TABLE 2. The n modulated digital signals reach as many DUCs (Digital Up Converters) inside the MULTICARRIER DIGITAL TRANSMITTER. Each DUC further receives a respective local oscillator signal $f_{IF\text{-}DUC}$ for the translation of its base band input signal to a prefixed position inside the overall Intermediate Frequency band. For this aim the $f_{IF\text{-}DUC}$ signals are digital sinusoids. The n IF digital signals are summed up by a digital adder working at the higher $f_{IF\text{-}DUC}$ frequency, and the multicarrier IF resulting signal is D/A converted and wide band filtered before reaching the input of an IF/RF mixer piloted by a $f_{OL\text{-}TX}$ local oscillator signal to the up conversion at radiofrequency. The RF signal at the output of the mixer is sent to an RF power amplifier. The output of the RF power amplifier is connected to the TX port of the Duplexer filter, while the RX port is connected to the Image filter placed at the input of the MULTICARRIER DIGITAL RECEIVER. The RF filtered signal is amplified and down converted to IF by an RF/IF mixer piloted by a $f_{OL\text{-}RX}$ local oscillator signal. The multicarrier analog IF signal is anti-alias filtered and fed to the input of n DDCs (Digital Down Converters) inside the MULTICARRIER DIGITAL RECEIVER. Each DDC further receives a respective local oscillator signal $f_{IF\text{-}DDC}$ for the translation to base band its input signal relevant to a prefixed position inside the overall Intermediate Frequency band. For this aim the $f_{IF\text{-}DDC}$ signals are digital sinusoids. The n digital base band signals reach as many Equalizer & Demodulator to be demodulated in respect of the MCS schemes listed in TABLE 2. The same arguments as the Viterbi's estimator of FIG. 5 are still valid. The demodulated signals are sent to the Base band processors to undergoes: Burst disassembling, Deciphering, De-interleaving, and Channel decoding in respect of TABLES 1 and 2. Finally the decoded data relevant to CH1, . . . CHn channels are delivered to the A-bis INTERFACE functional block to be assembled into one 2 M/bit outgoing PCM link or PCU frames. Control Processor block includes a memory RAM for temporarily store Level 2 and Level 3 signaling messages for all the n users. The BTS Control Processor governs the main operational procedures of the Mobile station MS/UE through a first and group of signals indicated as "TRANSMITTING SECTION control", "Signaling insertion"; and a second group of signals indicated as "RECEIVING SECTION control", "Signaling extraction". Among these signals a MAIO group is directed to the Frequency Synthesiser & Hopping unit in order to provide indication for frequency hopping and handover as far as concerns all the DUC and DDC circuits. Control Processor block includes a memory RAM for temporarily store Level 2 and Level 3 signaling messages for all the n users. Extracted signaling concerns, for example: measures transmitted uplink by all the Mobile stations (level, BER, C/I, OK flag, etc.), the statuses of the IRout overflow indicators, etc. Inserted signaling concerns, for example: Power control commands directed to each Base band processor, Timing advance commands, selection of the individual MCS scheme for transmission and/or reception, etc.

The reference frame of a known GSM-EGPRS system has been completed at this point of the disclosure. So the basis for the introduction of the features typical of the invention are given. The relevant means of the invention to carry out uplink and/or downlink TBF link adaptation constitute a particular combination of known and new means like the following list, in which when not expressly mentioned they are preferably allocated to the PCU and either confined in the firmware or in dedicated circuits:

- memory matrix tables for memorizing as many sets of digital values intended as BLER thresholds; the tables being managed by the Packet Control Unit (PCU). The thresholds being calculated off-line in a way that will be soon illustrate and they are valid both for uplink and downlink adaptation;
- means of the PCU for the selection of the tables;
- means allocated both to the BTS and the mobile stations for decoding RLC received blocks, optionally capable of joint decoding Incremental Redundancy bits,
- means allocated both to the BTS and the mobile stations for detecting and storing RLC blocks erroneously received;
- means allocated both to the BTS and the mobile stations for retransmitting erroneously received blocks;
- means for calculating BLER of an active TBF by filtering a variable indicating the RLC blocks not correctly received;
- means for checking the performance of the Incremental Redundancy detection;
- means for filtering a variable indicating the effectiveness of the Incremental Redundancy detection;

means for continuously updating the BLER thresholds on the basis of said effectiveness variable;

means to compare the calculated BLER with the updated BLER thresholds in order to obtain a criterion for changing the actual MCS;

means of the PCU to command a new MCS on the basis of said criterion for changing the actual MCS;

means of the BSC for updating the transmission power level of each uplink/downlink channel in order to maintain a fixed target throughput independently on the MCSs.

With reference to the FIGS. 7 to 14 the preliminary off-line simulation step useful for determining the various sets of BLER thresholds is now considered. Those figures are to be considered two at a time, such as: FIGS. 7 and 8; 9 and 10; 11 and 12; 13 and 14. The arguments relative to the first couple of FIGS. 7 and 8 are generally still valid for the other couple of figures. FIG. 7 shows some curves of net throughput (kbit/s) in function of C/I (dB) for several Modulation and Coding Schemes. FIG. 8 shows correspondent curves of BLER (dB or %) in function of C/I (dB) for the same MCSs of FIG. 7. Four MCSs are represented in FIG. 7 indicated with a, b, c, d; they respectively coincide with MCS1, MCS3, MCS6, and MCS9 of TABLE 2. It can be appreciate that the listed MCSs is a subset of all the possible MCSs constituting a sequence of MCSs arranged by increasing nominal throughputs. Curves of FIG. 7 are referred to a standard channel TU3 (Typical Urban—3 ray model) without Frequency Hopping and without Incremental Redundancy (only Type I ARQ is admitted), they are valid for both uplink and downlink TBFs. The depicted values are the result of a computer simulation refined and validated through on field measures. Curves of FIG. 7 are derived from curves of FIG. 8 by using the relation (1).

Because of the trends of the various MCS curves of FIG. 7 are not similar to that of parallel lines, six different cross-points are visible in correspondence of as many values of C/I. Cross-points are characterized by equal net throughputs for at least two MCS curves. Cross-points relevant for the present invention are only the three relative to adjacent MCSs in the ordered sequence, namely: a-b, b-c, and c-d. In order to maximize throughput the higher order MCS should be selected at the right of the switching point, while the lower order MCS should be chosen when the RF channel conditions are at the left of the cross point. This behavior is due to the decreasing protection of the higher MCS at the lower C/I and the consequent retransmission of the errored radio blocks. Referring to the previous cross-points of FIG. 7 the 'ideal' switching points between two adjacent MCSi could be the following:

| | |
|---|---|
| MCS a ↔ MCS b: | C/I ≈ 1.5 dB |
| MCS b ↔ MCS c: | C/I ≈ 7.5 dB |
| MCS c ↔ MCS d: | C/I ≈ 16 dB |

But C/I values are difficult to estimate in a real network, while other parameters, such as BLER, can be calculated directly. The Link Adaptation algorithm here proposed will then be based on direct BLER measurements. The previous calculated 'ideal' C/I switching points now correspond to the following 'ideal' couples of BLER thresholds mapped on the curves of FIG. 8:

$MCS\ a \leftrightarrow MCS\ b: C/I = 1.5\ dB \Rightarrow$
$BLER_{MCS1 \rightarrow MCS3} = Tab,\ BLER_{MCS3 \rightarrow MCS1} = Tba;$ $MCS\ b \leftrightarrow MCS\ c: C/I = 7.5\ dB \Rightarrow$
$BLER_{MCS3 \rightarrow MCS6} = Tbc,\ BLER_{MCS6 \rightarrow MCS3} = Tcb;$ $MCS\ c \leftrightarrow MCS\ d: C/I = 16\ dB \Rightarrow$
$BLER_{MCS6 \rightarrow MCS9} = Tcd,\ BLER_{MCS9 \rightarrow MCS6} = Tdc.$ Net throughput is then maximized changing the MCS according to these BLER threshold values. If actual BLER falls below the upgrade threshold (Tab, Tbc, Tcd) the algorithm switches to the next (less protected) available MCS. If actual BLER instead exceeds the downgrade threshold (Tab, Tbc, Tcd) the algorithm switches to the previous (more protected) available MCS. For example, if BLER goes below Tbc, while using MCS b, then a change to MCS c will be decided. On the contrary, if BLER goes above Tba, while using MCS b, then a change to MCS a will be decided.

If the RF environment changes, the MCS's performances curves change as well. Therefore the 'ideal' switching points depend on the actual RF environment. As an example, 'ideal' switching points may be different if Frequency Hopping is enabled or disabled in the network. Though the possible RF scenarios are virtually infinite, as already anticipated in the introduction, in a typical urban environment, only two different cases can be taken into account: a "low diversity" and a "high diversity" scenario.

The "low diversity" scenario corresponds to the family of curves represented in FIGS. 7 and 8 and should be selected if the cell is characterized by a low user mobility, such as: pico-cells, indoor cells, etc. without Frequency Hopping.

The "high diversity" scenario corresponds to the family of curves represented in FIGS. 9 and 10 and should be selected if the cell is characterized by a higher user mobility, such as ≈50 km/h mobile speed, or if Frequency Hopping is enabled. Simulation results represented in FIGS. 9 and 10 have been obtained in absence of IR.

For each specific RF scenario different upgrade switching points and downgrade switching points are derived through simulations and on field measures. These values of the switching points constitute as many sets of thresholds stored in matrix tables. Once the particular RF scenario has been assigned, the corresponding matrix table is selected, containing all the ideal switching points (downgrade/upgrade switching points from/to all MCSs) for that case. The initial MCS has to be defined as said later on.

Things are further complicated when type II Hybrid ARQ (Incremental Redundancy) is utilized. In the FIGS. 11, 12 and 13, 14 simulation results with IR (and infinite memory) are presented for the same scenarios described above. More precisely, simulation results represented in FIGS. 11 and 12 concern cells characterized by "low diversity" in presence of Incremental Redundancy. In this case it can be seen that MCS d outperforms all others MCS for a wide range of C/I ratios and the setting of the switching points will require some further considerations. Simulation results represented in FIGS. 13 and 14 concern cells characterized by "high diversity" in presence of Incremental Redundancy. Even here further considerations are necessaries. In any case it should be noticed that again, even in presence of Incremental Redundancy, the resulting performance depends on the actual RF scenario. Moreover results depend on the amount of memory available for Incremental Redundancy. Anyway, as a result, when IR is taken into account, different BLER threshold values should be considered. Even these values should be stored in matrix tables, one for each possible RF scenario.

Figure 15:
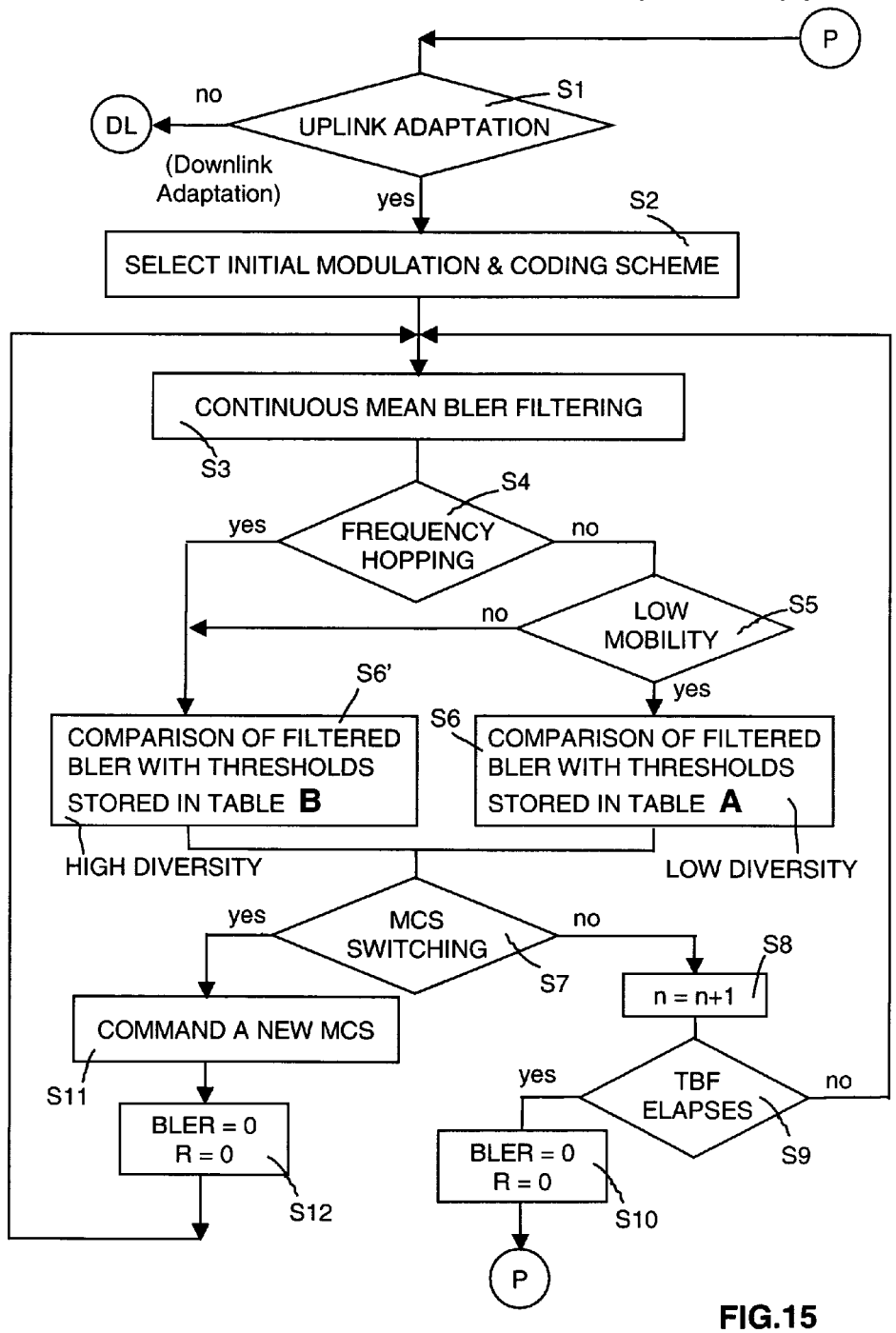
FIGS. 15 and 16 show respective flow charts of the link adaptation method of the present invention.
Figure 16:
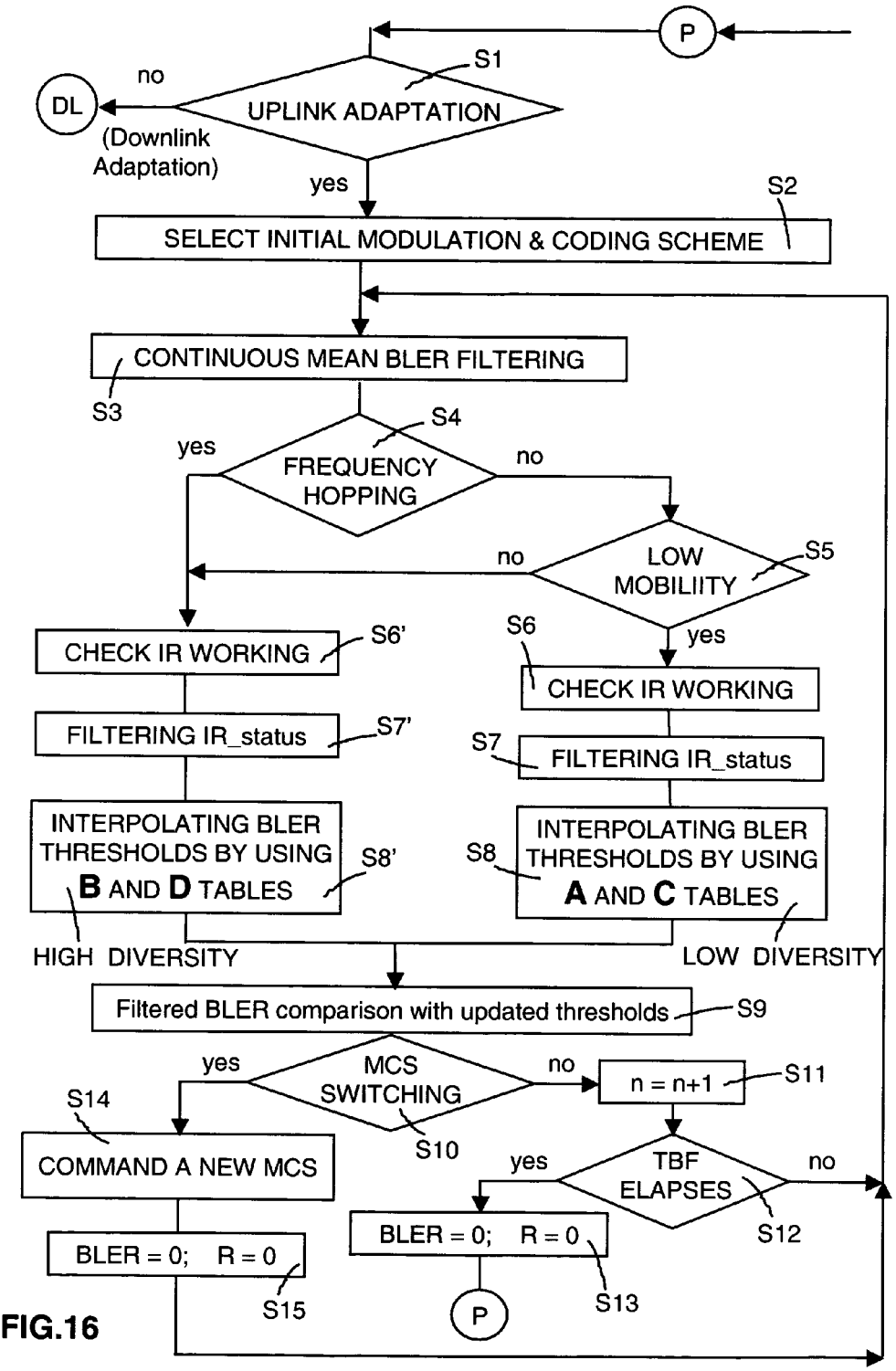

With reference to the FIGS. 15 and 16, the Link Adaptation method subject of the present invention is discussed. For the sake of simplicity the method is like a flow-chart of a program which controls a microprocessor inside the PCU (FIGS. 1). In the reality the various steps of the program interact with the involved protocol procedures and signaling. The previous off-line step for obtaining the BLER threshold matrix tables shall be considered as a preliminary part of the method. FIG. 15 concerns a simplified method valid for a packed data scenario without Incremental Redundancy and either characterized by low or high variability. FIG. 16 differs from FIG. 15 in that Incremental Redundancy is considered. Matrix tables relative to the FIGS. 8, 10, 12, and 14 have been respectively indicated as Table A, B, C, and D.

The method of FIG. 15 starts with step S1 which addresses the TBFs adaptation either uplink or downlink. Presently uplink TBFs are considered, successively the modifications for downlink TBFs will be introduced. In the subsequent step S2 the connection is established and the Initial Modulation and Coding Scheme is decided. The initial MCS will be the default one, unless some information is available about the last MCS used for a previous UL TBF characterized by the same Temporary Logical Link Identity (TLLI). In this case the initial MCS of the new TBF will be set by default or unless some other information is available. In step S3 at the network side value of BLER is continuously updated, at each received radio block, by checking if RLC blocks have been carefully received or not. BLER at instant n, for a given TBF connection, is obtained by a digital filter having a pulse response exponentially decreasing with time discrete n as indicated by the following law:

$$BLER_n = f_1(BLER_{n-1}) + f_2(s_n) \quad (2u)$$

where:

n is the iteration index spanning one radio block period of 20 ms;

$s_n=0$ if the RLC block at instant n has been correctly received (and the MCS is the "commanded MCS");

$s_n=1$ if the RLC block at instant n has not been correctly received;

$$s_n = \frac{1}{K}\sum_{k=1}^{K} s_{n,k} \quad (3u)$$

if more than one RLC block is received $s_n$ is the average of the values calculated for single blocks. De facto more than one RLC block for a given TBF can be received at the same time instant n, due to 1) multislot allocation, 2) MCSs supporting two RLC blocks at a time.

$f_1(BLER_{n-1})$ is a first weight function of the preceding filtered BLER value relative to the "commanded MCS" (i.e. actual MCS) blocks only, taking values inside the interval 0-1;

$f_2(s_n)$ is a second weight function of the variable $s_n$, taking values inside the interval 0-1;

Taking into consideration the teaching of standard ETSI GSM 05.08 about time filtering of quality variables, for analogy, expression (2u) now assumes the following expression:

$$BLER_n = \left(1 - \beta \cdot \frac{x_n}{R_n}\right) \cdot BLER_{n-1} + \beta \cdot \frac{x_n}{R_n} \cdot s_n \quad (2u')$$

where:

n is the iteration index spanning one radio block period of 20 ms;

$x_n$ is equal to 1 if "at least" one RLC block for the considered TBF with the "commanded MCS" is received at time instant n, otherwise is set to 0;

$s_n$ has been already defined;

β is the forgetting factor:

$\beta = 1/T_{AVG}$, $T_{AVG}$ being the filtering period in multiples of a radio block;

$R_n$ denotes the reliability of the $n_{th}$ BLER measurement and is expressed as follows:

$$R_n = (1-\beta) \cdot R_{n-1} + \beta \cdot x_n; \quad R_{-1}=0 \quad (4u)$$

$R_n$ is the output of a running average filter that helps to keep track of the reliability of the filtered BLER measurements. In fact $R_n$ is used in (2u') to decide the weight between the new measurement ($s_n$) and the old measurements ($BLER_{n-1}$). Looking at the formulas, it comes out that at time instants where no measurement exists (no RLC blocks are received for the considered TBF), $BLER_n$ will not be updated. On the contrary, when a measurement exists, $BLER_n$ will be updated weighting new and old contributions, so to obtain the desired exponentially decreasing (with discrete time n) filter impulse response. The reliability filter is initialized at the beginning of a transmission (n=0) setting $R_{-1}=0$.

By the comparison of expression (2u) with (2u') it results that:

$$f_1(BLER_{n-1}) = \left(1 - \beta \cdot \frac{x_n}{R_n}\right) \cdot BLER_{n-1}$$

$$f_2(s_n) = \beta \cdot \frac{x_n}{R_n} \cdot s_n.$$

Besides the two weight functions $f_1(BLER_{n-1})$ and $f_2(s_n)$ have balanced weights, so that an arbitrary weight increasing of $f_2(s_n)$ also involves an equal weight decreasing of $f_1(BLER_{n-1})$, and vice versa.

In next step S4 the presence of Frequency Hopping is checked. If the answer in step S4 is negative, the case of low diversity environment is checked in the successive step S5. Affirmative answer in step S5 enters step S6 in which the BLER filtered at step S3 is compared to the upgrade and downgrade thresholds stored in Table A. Negative answer in step S5 enters step S6' where the filtered BLER is compared to the thresholds stored in Table B. The comparison using Table B is also performed if Frequency Hopping were found active in the preceding step S4. Thresholds could be generalized in this way: put MCSx the actual MCS, MCSy the next available less protected one, and MCSz the previous available more protected one, then the appropriate thresholds will be:

| | |
|---|---|
| Upgrade thresholds (UP_th$_n$): | BLER$_{MCSx \to MCSy}$ |
| Downgrade thresholds (DN_th$_n$): | BLER$_{MCSx \to MCSz}$. |

Reaching the step S7 either from S6 or S6', the occurrence is checked of an MCS switching in consequence of the previous comparisons. If in step S7 the actual value of BLER doesn't cross any thresholds the subsequent step S8 performs an unitary increment of index n, then in step S9 the active state of the actual TBF is monitored. Until TBF is active the respective BLER is continuously monitored from the cycle of steps S3-S10 to check the conditions for switching from the actual MCS; if during the cycle the TBF elapses the incoming step S10 resets BLER and R and the program waits for another TBF. If during the cycle S3-S10 the actual BLER falls below the value UP_th$_n$, then MCSx is switched to MCSy in step S11. Alternatively, if during the cycle S3-S10 the actual BLER exceeds the value DN_th$_n$, MCSx is switched to MCSz in step S11. When commanding the new MCS to the MS, in a PACKET UPLINK ACK/NACK or PACKET TIMESLOT RECONFIGURE message, the PCU can also set the re-segment bit to the proper value. In general, for retransmissions, setting the re-segment bit to '1' requires the mobile station MS/UE to use an MCS within the same family as the initial transmission and the payload may be split. Instead setting the re-segment bit to '0' requires the mobile station shall use an MCS within the same family as the initial transmission without splitting the payload. TABLES 5 and 6 of the APPENDIX show MCS schemes to use for retransmission after switching to a different MCS. TABLE 5 is valid for re-segment bit=1, while TABLE 6 is valid for re-segment bit='0'. According to the invention, in the case under description (no Incremental Redundancy mode), the re-segment bit is always set to "1". Whenever the Modulation and Coding Scheme is changed, BLER and R variable are set to zero in the successive step S12 and the filtering process is re-started from step S3.

Additional advantages of the disclosed method are mostly due to the filtering step S3, they are:

Considering that at each iteration index n used in digital filter (2u) and (2u') (20 ms) could not correspond an RLC block for the intended TBF, due to the MAC scheduling mechanism, and that, on the contrary, a constant BLER filtering window is preferable in expression (2u'), then the reliability filter (4u) provides the way to keep constant the "actual" BLER filtering window, in that independent on the number of TBFs multiplexed on the same TS. Consequently the BLER digital filter (2u') is taken back to the RLC blocks effectively received in order to maintain the right exponentially decreasing impulse response.

Only blocks encoded with the present MCS contribute to BLER calculation. In other words, retransmissions with a different MCS don't have any impact on BLER calculation for the actual MCS.

With reference to the FIG. 16 changes in respect to the FIG. 15 are now discussed to be introduced in the link adaptation method due to the Incremental Redundancy. The first five steps S1 to S5 are the same as those of FIG. 15, in particular the filtering step S3. Additional problems arise when the actual thresholds for the BLER comparison shall be determined. These problems are of different nature and must be checked consequently, so step S6 (S6') is deliberately introduced for this aim. During this step the following routine is executed to set the logic value of a variable IR_check that contributes to the issue of an IR_status variable which gives information about the efficiency of Incremental Redundancy at the BTS:

```
IF
   {
      there has been an header error (this implies that IR for the expected block(s)
      is useless),
      OR
      if memory for IR is exhausted (no IR is possible for the expected block(s)),
      OR
      if soft decisions could not have been stored due to any other reason (again,
      no IR for the expected block(s))
   }
THEN    IR at time instant n is considered as "not working",
        IR_check$_n$ = 0
ELSE    IR at time instant n is considered as "working",
        IR_check$_n$ = 1.
```

The IR_status is then filtered in step S7 (S7') using the same approach used for BLER in step S3; in particular using a digital filter having a response exponentially decreasing with discrete time n as indicated by the following law:

$$IR\_status_n = f_1(IR\_status_{n-1}) + f_2(IR\_check_n) \quad (5u)$$

were function $f_1$ and $f_2$ follow the same laws as used in the BLER calculation. The analogy is extended to the most detailed function:

$$IR\_status_n = \left(1 - \beta \cdot \frac{x_n}{R_n}\right) \cdot IR\_status_{n-1} + \beta \cdot \frac{x_n}{R_n} \cdot IR\_check_n \quad (6u)$$

where: $x_n$, $R_n$, and $\beta$ are the same values used in the BLER calculation.

Differently from the preceding method of FIG. 15, BLER thresholds stored in the matrix tables are not immediately usable, since such thresholds depend on the used MCS but on the IR efficiency as well. So the successive step S8(S8') is charged to calculate suitable thresholds for taking IR into account. The new thresholds are the result of a linear interpolation between two extreme cases, namely: perfect IR (IR_status=1), and IR totally lacking (IR_status=0). Each case making reference to its own matrix tables. Absence of IR needs tables A and B, while perfect IR needs tables C and D, besides tables A and C simulate low diversity channels respectively without and with IR, while tables B and D high diversity channels respectively without and with IR. Consequently the linear interpolation in step S8 taking care of low diversity channels recurs to tables A and C, while the linear interpolation in step S8' taking care of high diversity channels recurs to tables B and D.

Indicating with $BLER_{MCSx\_wIR \to MCSy\_wIR}$, and $BLER_{MCSx\_wIR \to MCSz\_wIR}$ respectively the new upgrade UP_th and downgrade DN_th$_n$ thresholds for perfect IR, at the n-th block period, the linear interpolations calculated either in step S8 or S8' assume the following expressions:

$$UP\_th_n = (1 - IR\_status_n) \times BLER_{MCSx \to MCSy} + IR\_status_n \times BLER_{MCSx\_wIR \to MCSy\_wIR} \quad (7u)$$

$$DN\_th_n = (1 - IR\_status_n) \times BLER_{MCSx \to MCSz} + IR\_status_n \times BLER_{MCSx\_wIR \to MCSz\_wIR} \quad (8u)$$

The successive step S9 is charged to compare BLER filtered in step S3 with the new thresholds (7u) and (8u) either coming from step S8 or S8', then in step S10 the occurrence of an MCS switching in consequence of the previous comparisons is checked. If from the check of step S10 it results that in step S9 the actual BLER doesn't cross any UP_th$_n$ or DN_th$_n$ thresholds, the subsequent step S11 performs an unitary increment of index n, then in step S12 the active state of the actual TBF is monitored. Until TBF is active the respective BLER is continuously monitored from the cycle of steps S3-S12 to check the conditions for switching from the actual MCS; if during the cycle the TBF elapses the incoming step S13 resets BLER and R variables and the program waits for another TBF. If during cycle S3-S12 the actual BLER falls below the value UP_th$_n$, then in step S14 MCSx is switched to MCSy. Alternatively, if during the cycle S3-S12 the actual BLER exceeds the value DN_th$_n$, in step S14 MCSx is switched to MCSz. When commanding the new MCS to the mobile station, in a PACKET UPLINK ACK/NACK or PACKET TIMESLOT RECONFIGURE message, the PCU unit can also set the re-segment bit to the proper value. If IR_status$_n$<0.5 then IR is considered as "not-properly working" and the re-segment bit is set to '1'. On the contrary, if IR_status$_n$>0.5 then IR is considered as "properly working" and the re-segment bit is set to '0'. For retransmissions the previous considerations are still valid so as TABLES 5 and 6 of the APPENDIX.

Whenever the Modulation and Coding Scheme is changed, in the successive step S15 BLER and R variables are set to zero and the filtering process is re-started from step S3.

Additional advantage of the disclosed method is that it is independent on the memory size at the BTS. In fact if there is so much memory as the IR_status variable will always be close to 1, then in step S9 the "perfect IR" thresholds $BLER_{MCSx\_wIR \to MCSy\_wIR}$ and $BLER_{MCSx\_wIR \to MCSz\_wIR}$ will always be used, because they are prevailing in expressions (7u) and (8u). On the contrary, if the BTS has as low memory as IR_status variable will always be close to 0, then in step S9 the "no IR" thresholds $BLER_{MCSx \to MCSy}$, and $BLER_{MCSx \to MCSz}$ will always be used, because they are prevailing in expressions (7u) and (8u). It can be appreciated that through expressions 7u) and (8u) a sort of automatic switch between the two extreme conditions is performed.

The disclosure of how performing uplink adaptation with Incremental Redundancy carried out with reference to the FIG. 16 (the most general case), is nearly completely applicable to the downlink adaptation. Downlink adaptation is carried out by the network (BTS, BSC, PCU), as well as for uplink adaptation, but in case of downlink adaptation the receiving entities are the mobile stations which have to transmit to the network their own surveys on block decoding and the residual state of the IR memory. In practice, once the connection is established, BLER is updated at the PCU with the information provided by the EGPRS PACKET DOWNLINK ACK/NACK message, reported by the MS upon periodic request (polling) from the network. The exploitation by the PCU of the polled information suitable for calculating BLER imposes to change the time iteration index n used in the expressions (2u) and (2u') of the digital filters, and in the other descending expressions. In downlink case, time iteration index n for a given TBF connection must be replaced with reporting instant k for the same connection. So, the most general expression (2u) becomes:

$$BLER_k = f_1(BLER_{k-1}) + f_2(s_k) \quad (2d)$$

while more detailed expression (2u') requires a modification of the two weights and of the reliability variable R (expression 4u) to consider the greater lasting effect of reporting instant k. In that the following expression is valid for downlink adaptation:

$$BLER_k = \left(1 - \frac{\beta}{R_k}\right) \cdot BLER_{k-1} + \frac{\beta}{R_k} s_k \quad (2d')$$

where:
k is the reporting instant lasting m RLC blocks;

$$s_k = \frac{Nack\_blocks}{Sent\_blocks}$$

Nack_blocks: number of badly received RLC blocks among those sent with the present MCS.
Sent_blocks: number of blocks sent with the present MCS in the previous polling period.
β is the forgetting factor as already defined;
$R_k$ denotes the reliability of the filtered BLER measurement expressed as in the following:

$$R_k = (1-\beta)^m \cdot R_{k-1} + \beta; \quad R_{-1} = 0 \quad (4d)$$

where m is the number of radio blocks that elapsed since the last EGPRS PACKET DOWNLINK ACK/NACK message was received at the PCU. Again, $R_k$ is the output of a running average filter that helps to keep track of the reliability of the filtered BLER measurements. In fact $R_k$ is used to decide the weight between the new measurement ($s_k$) and the old measurements ($BLER_{k-1}$). When a new measurement exists (an EGPRS PACKET DOWNLINK ACK/NACK message is received), $BLER_k$ will be updated weighting new and old contributions, so to obtain the desired exponentially decreasing (with discrete time n) filter impulse response. The reliability filter is initialized at the beginning of a transmission (k=0) setting $R_{-1}=0$. Differently from expression (4u) that uses iteration index n, expression (4d) uses iteration index k spanning several time index n, nevertheless the two expression shall perform comparable filtering function on the same filtering window, exponent m used in expression (4d) provides to this task by increasing the effect of the single iteration k in a way to opportunely dampen the old measure and reinforce the new input as if m consecutive RLC blocks were filtered in the meanwhile.

Considerations about the Incremental Redundancy, to say expression (5u) and (6u) both pertaining to IR_status and IR_check variables remain formally unchanged by using the reporting instant k. The same applies to the settlement of upgrade and downgrade thresholds through the expressions (7u) and (8u). In particular, when an EGPRS PACKET DOWNLINK ACK/NACK message is received, the MS_OUT_OF_MEMORY bit is checked:

```
IF
  {
    this bit is set (no more memory for IR is available at the MS)
  }
THEN   IR at instant k is considered as "not working",   IR_check_k = 0
ELSE   IR at instant k is considered as "working",       IR_check_n = 1.
```

The IR status is then filtered using the same approach used for BLER:

$$IR\_status_k = f_1(IR\_status_{k-1}) + f_2(IR\_check_k) \tag{5d}$$

were function $f_1$ and $f_2$ follow the same laws as used in the BLER calculation. The analogy is extended to the most detailed function:

$$IR\_status_k = \left(1 - \frac{\beta}{R_k}\right) \cdot IR\_status_{k-1} + \frac{\beta}{R_k} \cdot IR\_check_k \tag{6d}$$

where $R_k$ (4d) and $\beta$ have already been introduced. The IR_status variable gives information about the efficiency of Incremental Redundancy at the MS.

Linear interpolations for updating all the upgrade and downgrade tabulated BLER thresholds associated to each available MCS take now the following expressions at the reporting instant k:

$$UP\_th_k = (1-IR\_status_k) \times BLER_{MCSx \to MCSy} + IR\_status_k \times BLER_{MCSx\_wIR \to MCSy\_wIR} \tag{7d}$$

$$DN\_th_k = (1-IR\_status_k) \times BLER_{MCSx \to MCSz} + IR\_status_k \times BLER_{MCSx\_wIR \to MCSz\_wIR} \tag{8d}$$

where: $UP\_th_k$ and $DN\_th_k$ are the upgrade and downgrade thresholds respectively. Additional advantages of downlink adaptation method are still those listed for uplink.

Figure 17:
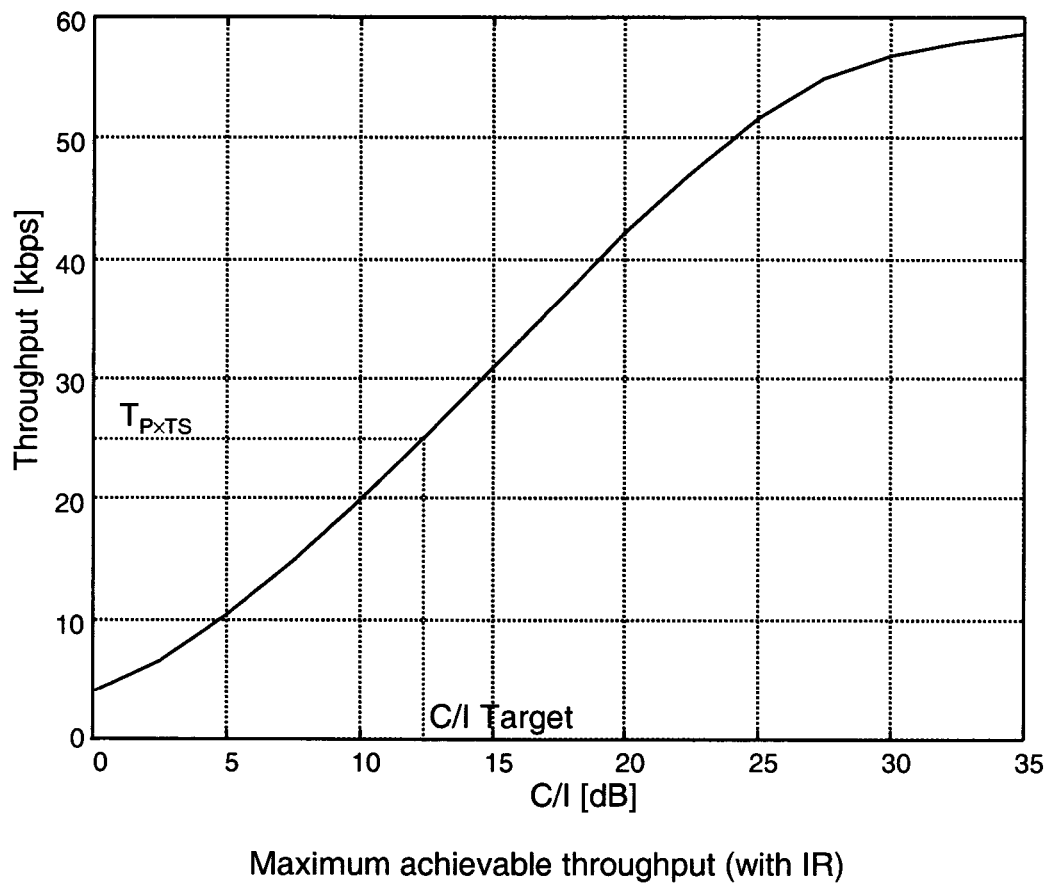
FIG. 17 shows a graphic representation used to implement the power control function at the Um interface of FIG. 1.

With reference to FIG. 17 a modified Power Control algorithm for pursuing aims as pursued by Link Adaptation object of the present invention is now disclosed. Without limiting the invention the modified Power Control algorithm attempts to maintain a high data throughput of transmitting entities subjected to Link Adaptation with Incremental Redundancy. The modified Power Control takes part in the off-line preliminary step of link adaptation by making use of the simulation curves of net throughput (kbit/s) in function of C/I (dB) for several Modulation and Coding Schemes. The curve that grants the maximum achievable throughput (i.e. the envelope of all the curves corresponding to the different MCS in the Incremental Redundancy case) is used and reproduced in FIG. 17 Target can be derived from the Peak Throughput QoS class requested by the mobile station. Be $T_P$ the Peak Throughput, then a Peak Throughput per timeslot, indicated as $T_{PxTS}$, is calculated:

$$T_{PxTS} = T_P/N_{TS} \tag{9}$$

where $N_{TS}$ is the number of timeslots allocated to the TBF; i.e. $N_{TS}$ is the minimum between the number of allocable timeslots and the number of timeslots that can be handled by the MS due to its multislot class.

Once $T_{PxTS}$ is set on the ordinate axis of the curve "Maximum achievable throughput", the curve itself associates to the $T_{PxTS}$ point a target $C/I_{target}$ value on the abscissa axis. In other words the couple of points ($C/I_{target}$, $T_{PxTS}$) is marked on the "Maximum achievable throughput" curve. $C/I_{target}$ value constitutes the goal of the modified Power Control algorithm. Traditional Power Control algorithm attempts to minimize transmission power compatibly with a minimum fixed quality of the transmitted signal checked by the receiving entity. To reach this aim it needs to handle measures included in the Measurement Channel Report. Once the measures have been acquired, the traditional Power Control algorithm starts to increase, or decrease, step by step the transmitted power until the outlined goal on minimum quality has been checked back from the measures. Modified Power Control algorithm works as the traditional one but with a different goal, namely it tries to maintain the $C/I_{target}$ target value for the duration of the whole TBF. The Link Adaptation algorithm subject of the present invention, on the other hand, continues to adapt to radio conditions, switching from one MCS to another, in order to optimize performance on net throughput. This may happen due to the fact that the power control cannot be "perfect" and therefore the actual C/I ratio may be different from the target one. From above it can be argued that the Modified Power Control algorithm works in synergy with the link adaptation, in that resolving the controversy outlined in the prior art.

APPENDIX

TABLE 1

Coding parameters for the GPRS coding schemes

| Scheme | Code rate | USF | Pre-coded USF | Radio Block excl. USF and BCS | BCS | Tail | Coded bits | Punctured bits | Data rate kb/s |
|---|---|---|---|---|---|---|---|---|---|
| CS-1 | 1/2 | 3 | 3 | 181 | 40 | 4 | 456 | 0 | 9.05 |
| CS-2 | ≈2/3 | 3 | 6 | 268 | 16 | 4 | 588 | 132 | 13.4 |
| CS-3 | ≈3/4 | 3 | 6 | 312 | 16 | 4 | 676 | 220 | 15.6 |
| CS-4 | 1 | 3 | 12 | 428 | 16 | — | 456 | — | 21.4 |

TABLE 2

Coding parameters for the EGPRS coding schemes

| Scheme | Code rate | Header Code rate | Modulation | RLC blocks per Radio Block (20 ms) | Raw Data within one Radio Block | Family | BCS | Tail payload | HCS | Data rat kb/s |
|---|---|---|---|---|---|---|---|---|---|---|
| MCS-9 | 1.0 | 0.36 | 8PSK | 2 | 2 × 592 | A | 2 × 12 | 2 × 6 | 8 | 59.2 |
| MCS-8 | 0.92 | 0.36 | | 2 | 2 × 544 | A | | | | 54.4 |
| MCS-7 | 0.76 | 0.36 | | 2 | 2 × 448 | B | | | | 44.8 |
| MCS-6 | 0.49 | 1/3 | | 1 | 592 | A | 12 | 6 | | 29.6 |
| | | | | | 544 + *48* | | | | | 27.2 |
| MCS-5 | 0.37 | 1/3 | | 1 | 448 | B | | | | 22.4 |
| MCS-4 | 1.0 | 0.53 | GMSK | 1 | 352 | C | | | | 17.6 |
| MCS-3 | 0.80 | 0.53 | | 1 | 296 | A | | | | 14.8 |
| | | | | | 272 + *24* | | | | | 13.6 |
| MCS-2 | 0.66 | 0.53 | | 1 | 224 | B | | | | 11.2 |
| MCS-1 | 0.53 | 0.53 | | 1 | 176 | C | | | | 8.8 |

NOTE: the italic captions indicate the padding.

APPENDIX

TABLE 3

MODULATION AND CODING SCHEMES FOR EGPRS

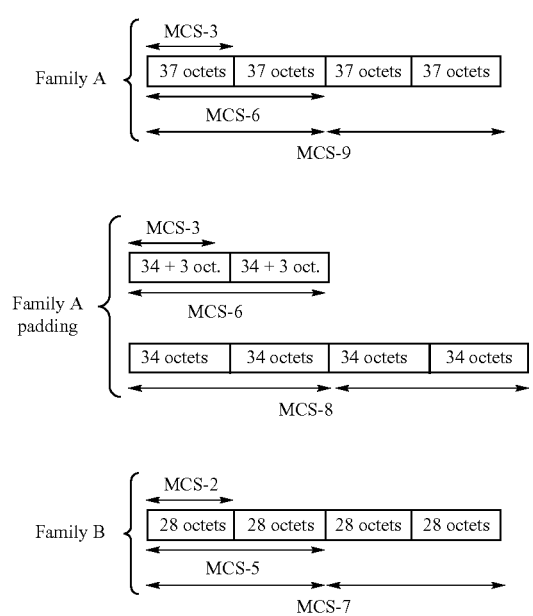

TABLE 3-continued

MODULATION AND CODING SCHEMES FOR EGPRS

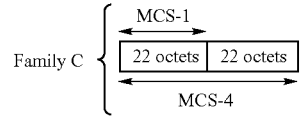

APPENDIX

TABLE 4

Puncturing Schemes (PS)

| MCS switched from | MCS switched to | PS of last transmission before MCS switch | PS of first transmission after MCS switch |
|---|---|---|---|
| MCS-9 | MCS-6 | PS 1 or PS 3 | PS 1 |
| | | PS 2 | PS 2 |
| MCS-6 | MCS-9 | PS 1 | PS 3 |
| | | PS 2 | PS 2 |
| MCS-7 | MCS-5 | any | PS 1 |
| MCS-5 | MCS-7 | any | PS 2 |
| all other combinations | | any | PS 1 |

APPENDIX

TABLE 5

MCS to use for retransmissions when re-segmentation (re-segment bit set to '1') is carried out (specified as a function of the scheme used for the initial transmission)

| Scheme used for initial transmission | Scheme to use for retransmissions after switching to a different MCS | | | | | | | | | |
|---|---|---|---|---|---|---|---|---|---|---|
| | MCS-9 Commanded | MCS-8 Commanded | MCS-7 Commanded | MCS-6-9 Commanded | MCS-6 Commanded | MCS-5-7 Commanded | MCS-5 Commanded | MCS-4 Commanded | MCS-3 Commanded | MCS-2 Commanded | MCS-1 Commanded |
| MCS-9 | MCS-9 | MCS-6 | MCS-6 | MCS-6 | MCS-6 | MCS-3 | MCS-3 | MCS-3 | MCS-3 | MCS-3 |
| MCS-8 | MCS-8 | MCS-8 | MCS-6 | MCS-6 | MCS-6 | MCS-3 | MCS-3 | MCS-3 | MCS-3 | MCS-3 |

TABLE 5-continued

MCS to use for retransmissions when re-segmentation (re-segment bit set to '1') is carried out (specified as a function of the scheme used for the initial transmission)

| Scheme used for initial transmission | Scheme to use for retransmissions after switching to a different MCS | | | | | | | | | | |
|---|---|---|---|---|---|---|---|---|---|---|---|
| | MCS-9 Commanded | MCS-8 Commanded | MCS-7 Commanded | MCS-6-9 Commanded | MCS-6 Commanded | MCS-5-7 Commanded | MCS-5 Commanded | MCS-4 Commanded | MCS-3 Commanded | MCS-2 Commanded | MCS-1 Commanded |
| MCS-7 | MCS-7 | MCS-7 | (pad) MCS-7 | (pad) MCS-5 | (pad) MCS-5 | (pad) MCS-5 | (pad) MCS-5 | (pad) MCS-2 | (pad) MCS-2 | (pad) MCS-2 | (pad) MCS-2 |
| MCS-6 | MCS-9 | MCS-6 | MCS-6 | MCS-9 | MCS-6 | MCS-3 | MCS-3 | MCS-3 | MCS-3 | MCS-3 | MCS-3 |
| MCS-5 | MCS-7 | MCS-7 | MCS-7 | MCS-5 | MCS-5 | MCS-7 | MCS-5 | MCS-2 | MCS-2 | MCS-2 | MCS-2 |
| MCS-4 | MCS-4 | MCS-4 | MCS-4 | MCS-4 | MCS-4 | MCS-4 | MCS-4 | MCS-4 | MCS-1 | MCS-1 | MCS-1 |
| MCS-3 | MCS-3 | MCS-3 | MCS-3 | MCS-3 | MCS-3 | MCS-3 | MCS-3 | MCS-3 | MCS-3 | MCS-3 | MCS-3 |
| MCS-2 | MCS-2 | MCS-2 | MCS-2 | MCS-2 | MCS-2 | MCS-2 | MCS-2 | MCS-2 | MCS-2 | MCS-2 | MCS-2 |
| MCS-1 | MCS-1 | MCS-1 | MCS-1 | MCS-1 | MCS-1 | MCS-1 | MCS-1 | MCS-1 | MCS-1 | MCS-1 | MCS-1 |

TABLE 6

MCS to use for retransmissions when re-segmentation is not (re-segment bit set to '0') allowed specified as a function of the scheme used for the initial transmission)

| Scheme used for initial transmission | Scheme to use for retransmissions after switching to a different MCS | | | | | | | | | | |
|---|---|---|---|---|---|---|---|---|---|---|---|
| | MCS-9 Commanded | MCS-8 Commanded | MCS-7 Commanded | MCS-6-9 Commanded | MCS-6 Commanded | MCS-5-7 Commanded | MCS-5 Commanded | MCS-4 Commanded | MCS-3 Commanded | MCS-2 Commanded | MCS-1 Commanded |
| MCS-9 | MCS-9 | MCS-9 | MCS-6 | MCS-6 | MCS-6 | MCS-6 | MCS-6 | MCS-6 | MCS-6 | MCS-6 | MCS-6 |
| MCS-8 | MCS-8 | MCS-8 | MCS-6 | MCS-6 | MCS-6 | MCS-6 | MCS-6 | MCS-6 | MCS-6 | MCS-6 | MCS-6 |
| MCS-7 | MCS-7 | MCS-7 | (pad) MCS-7 | (pad) MCS-5 | (pad) MCS-5 | (pad) MCS-5 | (pad) MCS-5 | (pad) MCS-5 | (pad) MCS-5 | (pad) MCS-5 | (pad) MCS-5 |
| MCS-6 | MCS-9 | MCS-6 | MCS-6 | MCS-9 | MCS-6 | MCS-6 | MCS-6 | MCS-6 | MCS-6 | MCS-6 | MCS-6 |
| MCS-5 | MCS-7 | MCS-7 | MCS-7 | MCS-5 | MCS-5 | MCS-7 | MCS-5 | MCS-5 | MCS-5 | MCS-5 | MCS-5 |
| MCS-4 | MCS-4 | MCS-4 | MCS-4 | MCS-4 | MCS-4 | MCS-4 | MCS-4 | MCS-4 | MCS-4 | MCS-4 | MCS-4 |
| MCS-3 | MCS-3 | MCS-3 | MCS-3 | MCS-3 | MCS-3 | MCS-3 | MCS-3 | MCS-3 | MCS-3 | MCS-3 | MCS-3 |
| MCS-2 | MCS-2 | MCS-2 | MCS-2 | MCS-2 | MCS-2 | MCS-2 | MCS-2 | MCS-2 | MCS-2 | MCS-2 | MCS-2 |
| MCS-1 | MCS-1 | MCS-1 | MCS-1 | MCS-1 | MCS-1 | MCS-1 | MCS-1 | MCS-1 | MCS-1 | MCS-1 | MCS-1 |

The invention claimed is:

1. A method for dynamically optimizing data throughput at radio interfaces of a packet data cellular network, said interfaces comprising one or more types of modulations having different immunity from transmission errors when used for transmitting bursts of data, said data being packed-up in blocks between mobile stations and serving base station and vice versa, comprising the steps of:

obtaining for each available modulation at least one of an upgrade and a downgrade tabulated threshold of the Block Error Rate delimiting a range in which the available modulation outperforms other available modulations in terms of net data throughput;

averaging and comparing the Block Error Rate, substantially continuously, of the relevant temporary connection with the tabulated thresholds for selecting the proper modulation; combining each available modulation with two or more coding schemes thereby obtaining many modulation-and-coding schemes with different protection against transmission errors;

obtaining for each modulation and coding scheme at least one of a first upgrade and a first downgrade tabulated Block Error Rate threshold which is valid for low-diversity radio frequency channels, delimiting a range in which the modulation and coding scheme outperforms the other available modulation and coding schemes in terms of net data throughput, and considering as low-diversity a channel without frequency hopping and with low user mobility;

obtaining for each modulation and coding scheme at least one of a second upgrade and a second downgrade tabulated Block Error Rate threshold which is valid for high-diversity radio frequency channels, delimiting a range in which the modulation and coding scheme outperforms the other available modulation and coding schemes in terms of net data throughput, and considering as high-diversity a channel characterized by frequency hopping or high user mobility;

selecting either the first or the second tabulated thresholds according to diversity of the radio frequency channel which sustains a temporary connection; and using the selected thresholds for discriminating a right modulation and coding scheme.

2. The method according to claim 1, wherein the step of discriminating a right modulation and coding scheme further comprises the steps of:

updating, at each new incoming block of data, an averaged value of Block Error Rate evaluated in correspondence of an actual modulation and coding scheme;

comparing the averaged Block Error Rate with the at least one of the upgrade and downgrade thresholds of the actual modulation and coding scheme; and replacing the actual modulation and coding scheme with a modulation and coding scheme immediately less error protected when the averaged Block and Error Rate is lower than the upgrade threshold; or replacing the actual modulation and coding scheme with the modulation and coding scheme immediately more error protected when the averaged Block and Error Rate is higher than the downgrade threshold.

3. The method according to claim 1, further comprising the steps of:
obtaining for each modulation and coding scheme at least one of a third upgrade and third downgrade tabulated Block Error Rate thresholds valid for both low-diversity channels and incremental redundancy active, and
delimiting a range in which the modulation and coding scheme outperforms the other available modulation and coding schemes in terms of net data throughput.

4. The method according to claim 3, further comprising the steps of:
obtaining for each modulation and coding scheme at least one of a fourth upgrade and downgrade tabulated Block Error Rate thresholds valid for both high-diversity channels and incremental redundancy active, and
delimiting a range in which the modulation and coding scheme outperforms the other available modulation and coding schemes in term of net data throughput.

5. The method according to claim 4, wherein a receiving entity performs the steps of:
temporarily storing errored data blocks in a memory buffer for joint decoding with new transmissions of original blocks according to an incremental redundancy technique; and
continuously checking a condition of buffer full and other causes making retransmission with incremental redundancy inapplicable, for building a status variable which measures an averaged status of the incremental redundancy.

6. The method according to claim 5, wherein for each modulation and coding scheme a linear interpolation is performed run-time between at least one of the first and third upgrade thresholds and between the first and third downgrade thresholds, using the status variable as interpolating factor for unbalancing the entity of the interpolation either towards third thresholds when incremental redundancy prevails, or towards first thresholds in a contrary case.

7. The method according to claim 5, wherein for each modulation and coding scheme a linear interpolation is performed run-time between at least one of the second and fourth upgrade thresholds and between the second and fourth downgrade thresholds, using the status variable as interpolating factor for unbalancing the entity of the interpolation either towards fourth thresholds when incremental redundancy prevails, or towards second thresholds in the contrary case.

8. The method according to claim 5, wherein the averaged status of the incremental redundancy is obtained by:
weighting both a preceding and an actual values of a variable,
taking value 1 when incremental redundancy is properly working, and value 0 for the contrary, and
using a digital filter having a pulse response exponentially decreasing with discrete time n spanning a data block period.

9. The method according to claim 7, wherein the linear interpolations comprise the following expressions:

$UP\_th_n = (1-IR\_status_n) \times BLER_{MCSx \to MCSy} + IR\_status_n \times BLER_{MCSx\_wIR \to MCSy\_wIR}$ $DN\_th_n = (1-IR\_status_n) \times BLER_{MCSx \to MCSz} + IR\_status_n \times BLER_{MCSx\_wIR \to MCSz\_wIR}$ wherein:
$UP\_th_n$ and $DN\_th_n$ are upgrade and downgrade thresholds, respectively, at an n-th block period;
$BLER_{MCSx \to MCSy}$ is an upgrade first (A) or second (B) tabulated threshold;
$BLER_{MCSx\_wIR \to MCSy\_wIR}$ is an upgrade third (C) or fourth (D) tabulated threshold;
$BLER_{MCSx \to MCSz}$ is a downgrade first (A) or second (B) tabulated threshold;
$BLER_{MCSx\_wIR \to MCSz\_wIR}$ is a downgrade third (C) or fourth (D) tabulated threshold.

10. The method according to claim 8, wherein the temporary connection is dedicated to transfer packet data from a selected mobile station to the base station, and said pulse response of the digital filter of the status variable is obtained according to the following function:

$IR\_status_n = f_1(IR\_status_{n-1}) + f_2(IR\_check_n)$ wherein:
n is an iteration index spanning one block period; and
$f_1$ and $f_2$ are weight functions according to same laws as used in the Block Error Rate calculation.

11. The method according to claim 10, wherein the first and second weight functions comprise the following expressions:

$$f_1(IR\_status_{n-1}) = \left(1 - \beta \cdot \frac{x_n}{R_n}\right) \cdot IR\_status_{n-1}$$

$$f_2(IR\_check_n) = \beta \cdot \frac{x_n}{R_n} \cdot IR\_check_n$$

wherein: $R_n$ takes a formal expression as that used in the Block Error Rate calculation, while $x_n$ and $\beta$ are the same.

12. The method according to claim 1, wherein the averaged value of Block Error Rate is obtained by weighting both preceding values of Block Error Rate and actual decisions on errored blocks, using a digital filter having a pulse response exponentially decreasing with discrete time n spanning a block period.

13. The method according to claim 12, wherein the pulse response of the digital filter of Block Error Rate is obtained by summing two weight functions both accepting samples with a commanded modulation and coding scheme, a first one to weigh the preceding values of Block Error Rate and the second one to weigh the actual decisions on errored blocks.

14. The method according to claim 13, wherein the first and second weight functions have balanced weights, so that an arbitrary increasing of a weight of the first function also involves an equal decreasing of the weight of the second function, and vice versa.

15. The method according to claim 14, wherein the weight of the first and second weight functions are both equally varied in order to compensate a missing filtering effect of possible lacking blocks, in that making an outlined pulse response possible.

16. The method according to claim 15, wherein the first and second weights are carried out by making the first and second weight functions further depending on a reliability function which tracks an age of the received blocks.

17. the method according to claim 16, wherein the temporary connection is dedicated to transfer packet data from a selected mobile station to the base station, and the pulse response of Block Error Rate digital filter is obtained according to the function:

$$BLER_n = f_1(BLER_{n-1}) + f_2(s_n)$$

wherein:
n is an iteration index spanning one block period;
$s_n=0$ when a block at instant n has been correctly received;
$s_n=1$ when a block at instant n has not been correctly received;

$$s_n = \frac{1}{K}\sum_{k=1}^{K} s_{n,k}$$

when K blocks are received for a considered connection;
$f_1(BLER_{n-1})$ is the first weight function, taking values inside an interval 0-1; and
$f_2(s_n)$ is the second weight function of the variable $s_n$ relative to a decision on the errored blocks, taking values inside the interval 0-1.

18. the method according to claim 16, wherein the temporary connection is dedicated to transfer packet data from the base station to a selected mobile station, and the pulse response of Block Error Rate digital filter is obtained according to the following function:

$$BLER_k = f_1(BLER_{k-1}) + f_2(s_k)$$

wherein:
k is a reporting instant lasting m blocks;

$$s_k = \frac{Nack\_blocks}{Sent\_blocks}$$

Nack_blocks: number of badly received blocks among those sent with a present MCS;
Sent_blocks: number of blocks sent with a present MCS in a previous polling period:
$f_1(BLER_{k-1})$ is the first weight function, taking values inside an interval 0-1; and
$f_2(s_k)$ is the second weight function of the variable $s_k$ relative to the decision on the errored blocks, taking values inside the interval 0-1.

19. The method according to claim 17, wherein the first and second weight functions comprise the following expressions:

$$f_1(BLER_{n-1}) = \left(1 - \beta \cdot \frac{x_n}{R_n}\right) \cdot BLER_{n-1}$$

$$f_2(s_n) = \beta \cdot \frac{x_n}{R_n} \cdot s_n$$

wherein:
$x_n$ is equal to 1 when "at least" one Radio Link Control (RLC) block for a considered connection with a commanded MCS is received at time instant n, otherwise is set to 0;

$\beta=1/T_{AVG}$ is a forgetting factor and $T_{AVG}$ being a filtering period in multiples of a radio block; and
$R_n=(1-\beta)\cdot R_{n-1}+\beta\cdot x_n$; $R_{-1}=0$ is said reliability function.

20. The method according to claim 18, wherein the first and second weight functions comprise the following expressions:

$$f_1(BLER_{k-1}) = \left(1 - \frac{\beta}{R_k}\right) \cdot BLER_{k-1}$$

$$f_2(s_k) = \frac{\beta}{R_k} \cdot s_k$$

wherein:
$\beta=1/T_{AVG}$ is a forgetting factor and $T_{AVG}$ being a filtering period in multiples of a radio block; and
$R_k=(1-\beta)^m \cdot R_{k-1}+\beta$; $R_{-1}=0$ is said reliability function.

21. The method according to claim 20, wherein the temporary connection is dedicated to transfer packet data from the base station to a selected mobile station, and the pulse response of the status variable digital filter is obtained according to the following function:

$$IR\_status_k = f_1(IR\_status_{k-1}) + f_2(IR\_check_k)$$

wherein:
k is a reporting instant lasting m blocks;
$f_1$ and $f_2$ are weight functions following the same laws as used in the Block Error Rate calculation.

22. The method according to claim 21, wherein the first and second weight functions comprise the following expressions:

$$f_1(IR\_status_{k-1}) = \left(1 - \frac{\beta}{R_k}\right) \cdot IR\_check_{k-1}$$

$$f_2(IR\_check_k) = \frac{\beta}{R_k} \cdot IR\_check_k.$$

23. The method according to claim 1, wherein a modified power control works in parallel with the modulation and coding scheme switching link adaptation and the modified power control includes the following steps:
off-line calculation of the expression:

$$T_{PxTS} = T_P/N_{TS},$$

wherein: $T_{PxTS}$ is a Peak Throughput per timeslot; $T_P$ is a Peak Throughput derived from a Quality of Service Class of the connection, and $N_{TS}$ is a minimum between a number of allocable timeslots and a number of timeslots that can be handled by the mobile station due to its multislot class;
off-line mapping of the calculated $T_{PxTS}$ on a simulated curve depicting a maximum achievable net throughput in function of values of Carrier versus Interference C/I, and obtaining from the curve a target $C/I_{target}$ value; and
exploiting the $C/I_{target}$ for all duration of the ongoing connection as a goal to be maintained by the network exploiting the Power and Interference measures at a receiver side.

* * * * *